(12) United States Patent
Zhu et al.

(10) Patent No.: US 12,192,812 B2
(45) Date of Patent: Jan. 7, 2025

(54) TECHNIQUES FOR PER-POLARIZATION BEAM SCHEDULING FOR MULTIPLE-INPUT MULTIPLE-OUTPUT (MIMO) COMMUNICATION

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/517,323

(22) Filed: Nov. 2, 2021

(65) Prior Publication Data

US 2022/0174531 A1 Jun. 2, 2022

Related U.S. Application Data

(60) Provisional application No. 63/119,374, filed on Nov. 30, 2020.

(51) Int. Cl.
*H04W 24/10* (2009.01)
*H04B 7/0456* (2017.01)
*H04B 17/318* (2015.01)
*H04L 5/00* (2006.01)
*H04W 24/08* (2009.01)

(52) U.S. Cl.
CPC .......... *H04W 24/10* (2013.01); *H04B 7/0456* (2013.01); *H04B 17/318* (2015.01); *H04L 5/0048* (2013.01); *H04W 24/08* (2013.01)

(58) Field of Classification Search
CPC .. H04B 7/0619; H04B 7/0456; H04B 7/0469; H04B 7/0628; H04B 7/063; H04B 17/318; H04L 1/0023; H04L 5/0023; H04L 5/0048; H04L 5/0094; H04L 5/14; H04W 16/28; H04W 24/08; H04W 24/10
See application file for complete search history.

(56) References Cited

U.S. PATENT DOCUMENTS

| | | | |
|---|---|---|---|
| 2018/0227928 A1* | 8/2018 | Kim | H04L 5/0023 |
| 2018/0262246 A1* | 9/2018 | Faxér | H04B 7/0452 |
| 2019/0044756 A1* | 2/2019 | Zhao | H04L 5/14 |
| 2019/0199410 A1* | 6/2019 | Zhao | H04B 7/0413 |
| 2019/0393948 A1* | 12/2019 | Zhao | H04B 7/0619 |

(Continued)

*Primary Examiner* — Michael Thier
*Assistant Examiner* — Prince A Mensah
(74) *Attorney, Agent, or Firm* — Holland & Hart LLP

(57) ABSTRACT

Methods, systems, and devices for wireless communications are described. In some systems, a user equipment (UE) may transmit or receive a reference signal to or from a base station using a beam pair including a first beam associated with a first polarization and a second beam associated with a second polarization. The UE may select the first beam from a first set of beams associated with the first polarization and may independently select the second beam from a second set of beams associated with the second polarization. In some examples, the UE may select the first beam and the second beam based on the first beam and the second beam each having a greatest beam strength (at the UE or the base station) relative to a remainder of the first set of beams and the second set of beams, respectively.

30 Claims, 13 Drawing Sheets

(56) References Cited

U.S. PATENT DOCUMENTS

| | | | |
|---|---|---|---|
| 2020/0059290 A1* | 2/2020 | Pan | H04W 24/10 |
| 2020/0275402 A1* | 8/2020 | Shi | H04W 16/28 |
| 2021/0058131 A1* | 2/2021 | Zhu | H04B 7/063 |
| 2021/0235452 A1* | 7/2021 | Huang | H04L 5/0094 |
| 2021/0306042 A1* | 9/2021 | Bshara | H04W 16/28 |
| 2022/0264653 A1* | 8/2022 | Xiong | H04L 1/0023 |
| 2022/0345200 A1* | 10/2022 | Flordelis | H04B 7/0695 |
| 2023/0170941 A1* | 6/2023 | Yu | H04B 7/0469 |
| | | | 375/262 |

* cited by examiner

| Transmit Beam | 0 | 1 | 2 | 3 |
|---|---|---|---|---|
| Receive Beams | (1H, 1V) | (3H, 3V) | (4H, 4V) | (2H, 2V) |

— 300

| Transmit Beam | 0 | 1 | 2 | 3 |
|---|---|---|---|---|
| Receive Beams | (1H, 4V) | (3H, 2V) | (4H, 1V) | (2H, 3V) |

— 301

TECHNIQUES FOR PER-POLARIZATION BEAM SCHEDULING FOR MULTIPLE-INPUT MULTIPLE-OUTPUT (MIMO) COMMUNICATION

CROSS REFERENCE

The present Application for Patent claims the benefit of U.S. Provisional Patent Application No. 63/119,374 by ZHU et al., entitled "TECHNIQUES FOR PER-POLARIZATION BEAM SCHEDULING FOR MULTIPLE-INPUT MULTIPLE-OUTPUT (MIMO) COMMUNICATION," filed Nov. 30, 2020, assigned to the assignee hereof, and expressly incorporated by reference herein.

FIELD OF TECHNOLOGY

The following relates to wireless communications, including techniques for per-polarization beam scheduling for multiple-input multiple output (MIMO) communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may perform a search and measurement procedure. As part of the search and measurement procedure, the base station may transmit one or more reference signals to the UE and the UE may measure the one or more reference signals.

SUMMARY

The described techniques relate to improved methods, systems, devices, and apparatuses that support techniques for per-polarization beam scheduling for MIMO communication. Generally, the described techniques provide for beam scheduling for a search and measurement procedure on a per-polarization basis. For example, a UE and a base station may communicate within a MIMO system and, based on implementing the described techniques, the UE may independently select a first beam associated with a first polarization and a second beam associated with a second polarization for the search and measurement procedure. The UE may implement such independent beam selection on a per-polarization basis in the context of a downlink-led search and measurement procedure or an uplink-led search and measurement procedure.

For example, the UE and the base station may perform a downlink-led search and measurement procedure in which the base station transmits one or more downlink reference signals and the UE measures the one or more downlink reference signals. In such examples in which the search and measurement procedure is downlink-led, the UE may receive a downlink reference signal via multiple receive beams at the UE, including a first receive beam associated with a first polarization and a second receive beam associated with a second polarization. In some implementations, the UE may select the first receive beam and the second receive beam from a beamforming codebook of the UE and independent of each other. For example, based on historical information (such as performance statistics) associated with each of the first receive beam and the second receive beam, the UE may independently determine that, of a first set of receive beams associated with the first polarization, the first receive beam will likely provide a greatest receive beam strength with respect to the downlink reference signal and that, of a second set of receive beams associated with the second polarization, the second receive beam will likely provide a greatest receive beam strength with respect to the downlink reference signal. Accordingly, the UE may measure the downlink reference signal on both the first receive beam and the second receive beam.

Additionally or alternatively, the UE and the base station may perform an uplink-led search and measurement procedure in which the UE transmits one or more uplink reference signals and the base station measures the one or more uplink reference signals. In such examples in which the search and measurement procedure is uplink-led, the UE may transmit an uplink reference signal via multiple transmit beams at the UE, including a first transmit beam associated with the first polarization and a second transmit beam associated with the second polarization. In some implementations, the UE may select the first transmit beam and the second transmit beam from a beamforming codebook of the UE and independent of each other. For example, based on historical information (such as performance statistics) associated with each of the first transmit beam and the second transmit beam, the UE may independently determine that, of a first set of transmit beams associated with the first polarization, the first transmit beam will likely provide a greatest receive beam strength at the base station and that, of a second set of transmit beams associated with the second polarization, the second transmit beam will likely provide a greatest receive beam strength at the base station. Accordingly, the UE may transmit the uplink reference signal via both the first transmit beam and the second transmit beam.

A method for wireless communication at a UE is described. The method may include receiving a downlink reference signal from a base station, selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook, measuring a receive strength of the downlink reference signal on both the first receive beam and the second receive beam, and transmitting, to the base station, a beam report that identifies the first receive beam and the second receive beam.

An apparatus for wireless communication at a UE is described. The apparatus may include a processor, memory in electronic communication with the processor, and instructions stored in the memory. The instructions may be executable by the processor to cause the apparatus to receive a downlink reference signal from a base station, select, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook, measure a receive strength of the downlink reference signal on both the first receive beam and the second receive beam, and transmit, to the base station, a beam report that identifies the first receive beam and the second receive beam.

Another apparatus for wireless communication at a UE is described. The apparatus may include means for receiving a downlink reference signal from a base station, means for selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook, means for measuring a receive strength of the downlink reference signal on both the first receive beam and the second receive beam, and means for transmitting, to the base station, a beam report that identifies the first receive beam and the second receive beam.

A non-transitory computer-readable medium storing code for wireless communication at a UE is described. The code may include instructions executable by a processor to receive a downlink reference signal from a base station, select, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook, measure a receive strength of the downlink reference signal on both the first receive beam and the second receive beam, and transmit, to the base station, a beam report that identifies the first receive beam and the second receive beam.

In some examples of the method, apparatuses, and non-transitory computer-readable medium described herein, selecting the first receive beam and the second receive beam may include operations, features, means, or instructions for selecting the first receive beam independent of the second receive beam.

In some examples of the method, apparatuses, and non-transitory computer-readable medium described herein, selecting the first receive beam and the second receive beam may include operations, features, means, or instructions for selecting at least one of the first receive beam and the second receive beam based on historical information stored at the UE.

In some examples of the method, apparatuses, and non-transitory computer-readable medium described herein, selecting the first receive beam and the second receive beam may include operations, features, means, or instructions for selecting the first receive beam from the first set of beams and the second receive beam from the second set of beams based on the first receive beam and the second receive beam each having a greatest receive beam strength with respect to the downlink reference signal relative to a remainder of the first set of beams and the second set of beams, respectively.

In some examples of the method, apparatuses, and non-transitory computer-readable medium described herein, historical information stored at the UE indicates that the first receive beam and the second receive beam each may have had the greatest receive beam strength with respect to the downlink reference signal relative to the remainder of the first set of beams and the second set of beams, respectively.

Some examples of the method, apparatuses, and non-transitory computer-readable medium described herein may further include operations, features, means, or instructions for communicating with the base station via at least one non-line-of-sight (NLoS) communication path using at least one of the first receive beam and the second receive beam.

In some examples of the method, apparatuses, and non-transitory computer-readable medium described herein, transmitting the beam report may include operations, features, means, or instructions for including in the beam report an indication of a first reference signal receive power (RSRP) value associated with use of the first receive beam and the second receive beam, where the first RSRP value may be greater than a second RSRP value associated with use of a pre-configured receive beam pair.

In some examples of the method, apparatuses, and non-transitory computer-readable medium described herein, the first polarization includes a horizontal polarization and the second polarization includes a vertical polarization.

In some examples of the method, apparatuses, and non-transitory computer-readable medium described herein, the downlink reference signal includes a synchronization signal block (SSB) having a beam index which corresponds to a transmission time interval (TTI).

In some examples of the method, apparatuses, and non-transitory computer-readable medium described herein, the beamforming codebook may be for MIMO communication.

In some examples of the method, apparatuses, and non-transitory computer-readable medium described herein, the UE and the base station communicate over a millimeter wave (mmW) radio frequency spectrum band.

A method for wireless communication at a UE is described. The method may include selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook, transmitting the uplink reference signal to a base station via both the first transmit beam and the second transmit beam, and receiving, from the base station, a beam report based on the transmission of the uplink reference signal via the first transmit beam and the second transmit beam.

An apparatus for wireless communication at a UE is described. The apparatus may include a processor, memory in electronic communication with the processor, and instructions stored in the memory. The instructions may be executable by the processor to cause the apparatus to select, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook, transmit the uplink reference signal to a base station via both the first transmit beam and the second transmit beam, and receive, from the base station, a beam report based on the transmission of the uplink reference signal via the first transmit beam and the second transmit beam.

Another apparatus for wireless communication at a UE is described. The apparatus may include means for selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook, means for transmitting the uplink reference signal to a base station via both the first transmit beam and the second transmit beam, and means for receiving, from the base station, a beam report based on the transmission of the uplink reference signal via the first transmit beam and the second transmit beam.

A non-transitory computer-readable medium storing code for wireless communication at a UE is described. The code may include instructions executable by a processor to select, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook, transmit the uplink reference signal to a base station via both the first transmit beam and the second transmit beam, and receive, from the base station, a beam report based on the transmission of the uplink reference signal via the first transmit beam and the second transmit beam.

In some examples of the method, apparatuses, and non-transitory computer-readable medium described herein, selecting the first transmit beam and the second transmit beam may include operations, features, means, or instructions for selecting the first transmit beam independent of the second transmit beam.

In some examples of the method, apparatuses, and non-transitory computer-readable medium described herein, selecting the first transmit beam and the second transmit beam may include operations, features, means, or instructions for selecting at least one of the first transmit beam and the second transmit beam based on historical information stored at the UE.

In some examples of the method, apparatuses, and non-transitory computer-readable medium described herein, selecting the first transmit beam and the second transmit beam may include operations, features, means, or instructions for selecting the first transmit beam from the first set of beams and the second transmit beam from the second set of beams based on the first transmit beam and the second transmit beam each having a greatest received beam strength at the base station relative to a remainder of the first set of beams and the second set of beams, respectively.

In some examples of the method, apparatuses, and non-transitory computer-readable medium described herein, historical information stored at the UE indicates that the first transmit beam and the second transmit beam each may have the greatest received strength at the base station relative to the remainder of the first set of beams and the second set of beams, respectively.

Some examples of the method, apparatuses, and non-transitory computer-readable medium described herein may further include operations, features, means, or instructions for communicating with the base station via at least one NLoS communication path using at least one of the first transmit beam and the second transmit beam.

In some examples of the method, apparatuses, and non-transitory computer-readable medium described herein, receiving the beam report may include operations, features, means, or instructions for identifying in the beam report an indication of a first RSRP value associated with use of the first transmit beam and the second transmit beam, where the first RSRP value may be greater than a second RSRP value associated with use of a pre-configured transmit beam pair.

In some examples of the method, apparatuses, and non-transitory computer-readable medium described herein, the first polarization includes a horizontal polarization and the second polarization includes a vertical polarization.

In some examples of the method, apparatuses, and non-transitory computer-readable medium described herein, the uplink reference signal includes a sounding reference signal (SRS).

In some examples of the method, apparatuses, and non-transitory computer-readable medium described herein, the beamforming codebook may be for MIMO communication.

In some examples of the method, apparatuses, and non-transitory computer-readable medium described herein, the UE and the base station communicate over an mmW radio frequency spectrum band.

DETAILED DESCRIPTION

Figure 1:
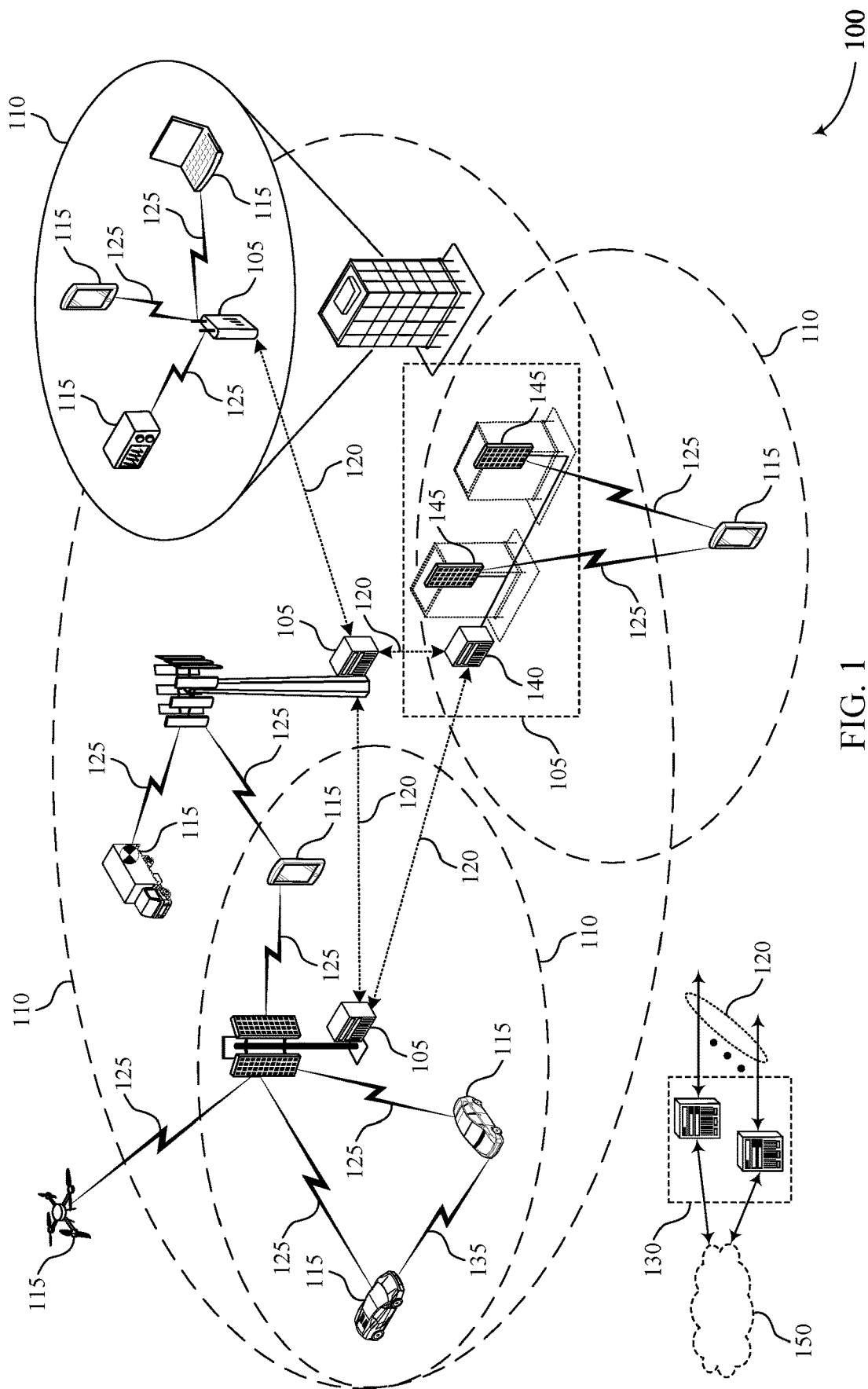
FIGS. 1 and 2 show examples of wireless communications systems that support techniques for per-polarization beam scheduling for MIMO communication in accordance with aspects of the present disclosure.

In some wireless communications systems, such as MIMO systems, a UE and a base station may communicate such that the UE or the base station, or both, may transmit or receive signaling simultaneously via multiple directional beams. For example, the base station may transmit signaling to the UE via one or more transmit beams and the UE may receive the signaling via multiple receive beams. In some cases, the UE may support the use of multiple beam polarizations such that the UE may transmit or receive via differently polarized beams (e.g., differently polarized radio waves) simultaneously without interference across polarizations. In some examples in which the UE supports multiple beam polarizations, the UE may generate a beamforming codebook including a first set of beams associated with a first polarization and a second set of beams associated with a second polarization and, in a search and measurement procedure, the UE may use a beam from each set of beams based on a pre-configured beam pairing. For instance, in examples in which the UE receives a reference signal from a base station, the UE may measure the reference signal on one beam from each set of beams based on the pre-configured beam pairings. In some cases (such as in cases in which the reference signal follows an NLoS path), however, the lack of flexibility for beam selection resulting from pre-configured beam pairings may result in the selection of beams that provide a relatively lower beam strength or a greater imbalance between the beams of a beam pair than other beams in the beamforming codebook.

In some implementations of the present disclosure, the UE may independently select a first beam from the first set of beams associated with the first polarization and a second beam from the second set of beams associated with the second polarization for measurement of a downlink reference signal or transmission of an uplink reference signal. In some examples, the UE may select the first beam from the first set of beams associated with the first polarization and the second beam from the second set of beams associated with the second polarization based on historical information stored at the UE relating to the beams in the beamforming codebook. For example, based on the historical information, the UE may determine that, for the downlink reference signal (which may be associated with a beam direction known or identifiable by the UE), the first beam and the second beam may have or otherwise provide a greatest beam strength with respect to the downlink reference signal relative to others (e.g., a remainder) of the first set of beams and the second set of beams, respectively. Additionally or alternatively, and similarly based on the historical information, the UE may determine that, for the uplink reference signal (which may be associated with a beam direction known or identifiable by the UE), the first beam and the second beam may have or otherwise provide a greatest receive strength at a base station with respect to the uplink reference signal relative to others (e.g., a remainder) of the first set of beams and the second set of beams, respectively.

Particular aspects of the subject matter described in this disclosure can be implemented to realize one or more of the following potential advantages. In some examples, the described techniques may be implemented to improve mobility support in search and measurement procedures. For instance, in scenarios in which a reference signal follows an NLoS path between the base station and the UE, independent search and measurement on each polarization (as opposed to on a pre-configured beam pair) may support improved mobility tracking because the UE may identify a suitable beam pair via independent per-polarization beam selection according to shorter timelines than may be otherwise achieved using pre-configured beam pairs. For example, the UE, based on implementing the described techniques, may identify a beam pair that has a greatest beam strength within one transmission occasion, while a UE using pre-configured beam pairs may identify a beam pair that has a greatest beam strength after two or more transmission occasions. As such, the UE may monitor fewer search and measurement resources for reference signals from the base station, which may reduce latency and improve power savings at the UE. Further, and based on independently selecting beams on a per-polarization basis, the UE may select a beam pair that provides a greater signal strength, such as a higher signal-to-noise ratio (SNR) (or rank-2 speff) or a higher RSRP, relative to a pre-configured beam pair.

Aspects of the disclosure are initially described in the context of wireless communications systems. Aspects of the disclosure are additionally illustrated by and described with reference to beam scheduling diagrams and process flows. Aspects of the disclosure are further illustrated by and described with reference to apparatus diagrams, system diagrams, and flowcharts that relate to techniques for per-polarization beam scheduling for MIMO communication.

FIG. 1 shows an example of a wireless communications system 100 that supports techniques for per-polarization beam scheduling for MIMO communication in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communications system 100 may be an example of a MIMO system in which one or more communicating devices may transmit or receive signaling using multiple directional beams. In some aspects, to support such use of multiple directional beams, the communicating devices may operate multiple antennas or antenna panels from which a device may form a directional beam. For example, a UE 115 or a base station 105, or both, may operate multiple antennas or antenna panels and may form a different beam from each of the multiple antennas or antenna panels. In some cases, the UE 115 or the base station 105, or both, may operate different antennas or antenna panels for different polarizations. For example, the UE 115 may operate at least two antenna panels including a first antenna panel configured for communication having a first polarization, such as a horizontal polarization, and a second antenna panel configured for communication having a second polarization, such as a vertical polarization.

As such, the UE 115 may transmit or receive signaling via a horizontally polarized beam (which may be referred to herein as an H-pol beam or an H beam) from the first antenna panel and the UE 115 may transmit or receive signaling via a vertically polarized beam (which may be referred to herein as a V-pol beam or a V beam) from the second antenna panel. The polarization of a beam may refer to the direction in which the electric field of a radio wave oscillates as it propagates over the air. For example, in implementations in which the UE 115 transmits or receives a signal having a horizontal polarization, the electric field of the radio wave carrying the signal may oscillate horizontally (or sideways) in a horizontal plane. In contrast, in implementations in which the UE 115 transmits or receives a signal having a vertical polarization, the electric field of the radio wave carrying the signal may oscillate vertically (or up and down) in a vertical plane. Additionally, in some cases, each polarization may correspond to an analog beam (e.g., an analog beam may have a horizontal polarization and a vertical polarization).

In examples in which two beams are transmitted with orthogonal polarizations (such as may be the case for horizontal and vertical polarizations, as the horizontal oscillation associated with a horizontal polarization may be orthogonal to the vertical oscillation associated with a vertical polarization), the two beams may be isolated from or minimally influenced by interference caused by the other. In other words, the UE 115 may transmit a first signal via a horizontally polarized beam and a second signal via a vertically polarized beam and the first signal may not interfere with the second signal, even in cases in which the first signal and the second signal are transmitted over the same resource (e.g., over the same time and frequency resource). Accordingly, the UE 115, or any other device capable of operating antenna panels for different polarizations, may use orthogonally polarized beams to transmit or receive signaling over the same resource, which may provide greater data rates or connectivity relative to use of a single beam.

In some examples, such as in examples in which the UE 115 and the base station 105 support 5G NR communication, such as communication over mmW frequencies (which may include frequencies above 6 GHz), the UE 115 and the base station 105 may perform a search and measurement procedure to identify or otherwise determine which transmit and receive beams to use for communication between the UE 115 and the base station 105. Further, and based on supporting communication over mmW frequencies, the wireless channel between the UE 115 and the base station 105 may change (sometimes rapidly) over time. In such search and measurement procedures over a time-varying wireless channel, the UE 115 and the base station 105 may support the use of multiple (such as two) polarizations (e.g., for MIMO transmissions). As such, in cases in which the UE 115 receives a reference signal from the base station 105, the UE 115 may select, from a set of pre-configured beam pairs, a beam pair including a first beam having a horizontal polarization and a second beam having a vertical polarization and may measure the downlink reference signal on each of the first beam and the second beam. In some cases, however, the propagation channel seen by the horizontal polarization and the vertical polarization may differ, which may result in imbalances between a first beam strength measured on the first beam and a second beam strength measured on the second beam.

In some implementations of the present disclosure, the UE 115 may select a horizontally polarized beam and a vertically polarized beam independently based on which beam of a set of horizontally polarized beams and which beam of a set of vertically polarized beams have greatest beam strengths with respect to a reference signal (either a downlink reference signal or an uplink reference signal). For instance, in examples in which the UE 115 receives a downlink reference signal from the base station 105, the UE 115 may determine, for that downlink reference signal, which horizontally polarized beam has a greatest receive beam strength of the set of horizontally polarized beams supported by the UE 115 and which vertically polarized beam has a greatest receive beam strength of the set of vertically polarized beams supported by the UE 115. Similarly, in examples in which the UE 115 transmits an uplink reference signal to the base station 105, the UE 115 may determine, for that uplink reference signal, which horizontally polarized beam has a greatest receive beam strength at the base station 105 of the set of horizontally polarized beams supported by the UE 115 and which vertically polarized beam has a greatest receive beam strength at the base station 105 of the set of vertically polarized beams supported by the UE 115.

Figure 2:
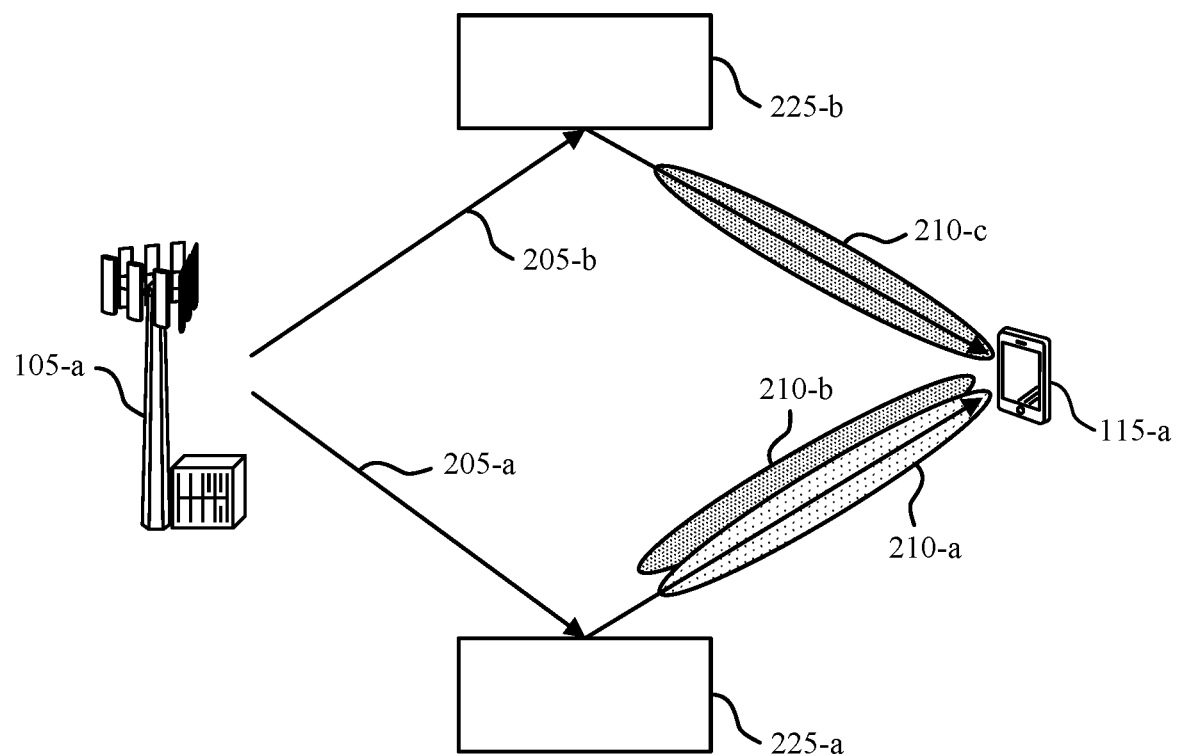

FIG. 2 shows an example of a wireless communications system 200 that supports techniques for per-polarization beam scheduling for MIMO communication in accordance with aspects of the present disclosure. The wireless communications system 200 may implement or be implemented to realize aspects of the wireless communications system 100. For example, the wireless communications system 200 may be an example of a MIMO system and may include a UE 115-a and a base station 105-a, which may be examples of corresponding devices described herein, including with reference to FIG. 1. In some examples, the UE 115-a may independently select two differently polarized beams 210, such as a beam 210 associated with a polarization 215 (e.g., a horizontal polarization) and a beam 210 associated with a polarization 220 (e.g., a vertical polarization), for measurement or transmission of a reference signal as part of a search and measurement procedure (e.g., as part of a 5G NR search and measurement procedure).

For example, the UE 115-a and the base station 105-a may perform or otherwise participate in a search and measurement procedure in which one of the UE 115-a and the base station 105-a transmits one or more reference signals and the other of the UE 115-a and the base station 105-a measures the one or more reference signals and generates a beam report based on the measurements. In some aspects, the UE 115-a and the base station 105-a may perform or participate in such a search and measurement procedure to determine or select which beams to use for communication between the UE 115-a and the base station 105-a. In some examples, the search and measurement procedure may be a downlink-led search and measurement procedure in which the base station 105-a transmits one or more downlink reference signals and the UE 115-a measures the one or more downlink reference signals and generates a beam report based on the measurements. In some other examples, the search and measurement procedure may be an uplink-led search and measurement procedure in which the UE 115-a transmits one or more uplink reference signals and the base station 105-a measures the one or more uplink reference signals and generates a beam report based on the measurements.

In examples in which the search and measurement procedure is a downlink-led search and measurement procedure, the base station 105-a may transmit the one or more downlink reference signals over one or more transmission occasions, such as TTIs. For example, the base station 105-a may transmit a number of downlink reference signals, such as SSBs or CSI-RSs, over a number of transmission occasions (such that one downlink reference signal is transmitted within each transmission occasion). The base station 105-a may transmit each downlink reference signal via a different transmit beam and the UE 115-a may measure each downlink reference signal on multiple beams 210 (which may function as receive beams in such examples) at the UE 115-a.

For each downlink reference signal (and correspondingly for each transmit beam used by the base station 105-a), the UE 115-a may select a beam 210 associated with the polarization 215 (e.g., an H-pol beam) and a beam 210 associated with the polarization 220 (e.g., a V-pol beam) on which to measure the downlink reference signal. The UE 115-a may select the H-pol beam and the V-pol beam from a beamforming codebook stored at the UE 115-a, which may be previously designed or generated (e.g., designed offline) based on electric field measurements, and based on pre-configured or static beam pairings. For example, the beamforming codebook may include a first set of beams 210 associated with the polarization 215 (e.g., the horizontal polarization) and a second set of beams 210 associated with the polarization 220 (e.g., the vertical polarization) and, based on the electric field measurements, the UE 115-a may select beams 210 from each set of beams 210 according to pre-configured beam pairings.

For instance, the beamforming codebook may include a first pre-configured beam pair including a first beam 210 associated with the polarization 215 and a second beam 210 associated with the polarization 220, a second pre-configured beam pair including a third beam 210 associated with the polarization 215 and a fourth beam 210 associated with the polarization 220, and so on. Accordingly, for each downlink reference signal received from the base station 105-a, the UE 115-a may select one beam pair from a set of pre-configured beam pairs and may measure the downlink reference on each beam 210 of the selected pre-configured beam pair. In some examples, such pre-configured beam pairs may be determined or grouped based on having a common orientation. For instance, a beam 210-a and a beam 210-b may be an example of a pre-configured beam pair in which the two beams 210 of the pre-configured beam pair may have a common orientation.

In some cases, however, such beam selection at a beam pair level of granularity may result in an imbalance between beam measurements obtained via the differently polarized beams 210 in a beam pair. For instance, in examples in which the UE 115-a selects to use the pre-configured or static beam pair including the beam 210-a and the beam 210-b, a receive beam strength measured for each of the beam 210-a and the beam 210-b with respect to a downlink reference signal may differ because the propagation channel seen by the two different polarizations may differ. Such difference or imbalance between the receive beam strength measured for each of the beam 210-a and the beam 210-b with respect to the downlink reference signal may increase in examples in which the UE 115-a receives the downlink reference signal from the base station 105-a over a communication path 205, which may be an example of an NLoS communication path.

For example, the base station 105-a may transmit the downlink reference signal via a transmit beam and the downlink reference signal may follow a communication path 205-a or a communication path 205-b, or both, over which the downlink reference signal may reflect off of one or more objects 225 (such as an object 225-*a* or an object 225-*b*, respectively). Such objects 225 may act as reflectors for the downlink reference signal and the UE 115-*a* may receive the downlink reference signal from different directions (e.g., from different angles-of-arrival) based on the reflection of the downlink reference signal. In such examples in which the UE 115-*a* may receive a downlink reference signal from different angles-of-arrival in an NLoS channel or over a communication path 205 (such as an NLoS communication path), beam selection at a beam pair level of granularity may result in inefficient selection of a suitable beam pair for communication between the UE 115-*a* and the base station 105-*a* because of relatively greater latency (e.g., a greater number of transmission occasions may be used to identify the suitable beam pair) and because less flexibility in beam selection may result in a relatively lower ability for the UE 115-*a* and the base station 105-*a* to track the mobility of the UE 115-*a* or provide a signal strength above a threshold. For example, environmental conditions that influence the communication path 205 that a downlink reference signal may follow may diverge from offline electric field measurements (according to which a pre-configured beam pair may be formed) within relatively short timelines or may change frequently, such that beam selection according to the pre-configured beam pairings may result in relatively poor receive strengths based on any divergence of the communication path 205 from the offline electric field measurements. Such environmental conditions may include a presence of objects 225 or system interference, among other examples of conditions that may influence a quality or reliability of a communication path 205 between the UE 115-*a* and the base station 105-*a*.

In some implementations of the present disclosure, the UE 115-*a* may select beams on which to measure a downlink reference signal from the base station 105-*a* or with which to transmit an uplink reference signal to the base station 105-*a* on a per-polarization basis. For example, in examples of a downlink-led search and measurement procedure (and, in some examples, in NLoS communication scenarios or scenarios that otherwise cause a communication path 205 between the UE 115-*a* and the base station 105-*a* to differ from a communication path 205 used for offline measurements), the UE 115-*a* may independently search for and measure a downlink reference signal on each polarization. For example, for each downlink reference signal received from the base station 105-*a*, the UE 115-*a* may independently select a first beam 210 from the first set of beams 210 associated with the polarization 215 and a second beam 210 from the second set of beams 210 associated with the polarization 220 on which to measure a downlink reference signal.

In some examples, for each downlink reference signal (and correspondingly for each transmit beam used by the base station 105-*a*), the UE 115-*a* may select the first beam 210 associated with the polarization 215 based on identifying or otherwise determining that the first beam 210 provides (or will likely provide) a greatest receive beam strength with respect to a downlink reference signal relative to a remainder of the first set of beams 210 supported by the UE 115-*a* that are associated with the polarization 215. Similarly, for each downlink reference signal (and correspondingly for each transmit beam used by the base station 105-*a*), the UE 115-*a* may select the second beam 210 associated with the polarization 220 based on identifying or otherwise determining that the second beam 210 provides (or will likely provide) a greatest receive beam strength with respect to a downlink reference signal relative to a remainder of the second set of beams 210 supported by the UE 115-*a* that are associated with the polarization 220.

In some aspects, for a first downlink reference signal, the UE 115-*a* may select the beam 210-*a* from the first set of beams 210 supported by the UE 115-*a* that are associated with the polarization 215 and the UE 115-*a* may independently select the beam 210-*c* from the second set of beams 210 supported by the UE 115-*a* that are associated with the polarization 220. In such aspects, the UE 115-*a* may identify that the beam 210-*a* and the beam 210-*c* provide (or will likely provide) a greatest receive beam strength with respect to the first downlink reference signal relative to the remainder of the first set of beams 210 associated with the polarization 215 and the second set of beams 210 associated with the polarization 220, respectively. In some examples, the UE 115-*a* may determine that the beam 210-*a* and the beam 210-*c* provide the greatest receive beam strengths based on historical information associated with each of the beam 210-*a* and the beam 210-*c*. For example, the UE 115-*a* may store historical information, such as beamforming statistics or performance statistics, for each beam 210 included in the beamforming codebook of the UE 115-*a* and the historical information may indicate a receive beam strength (or a likely receive beam strength) for each beam 210 with respect to different transmit beams used by the base station 105-*a*.

In some implementations, the UE 115-*a* may maintain or update the historical information based on receiving a downlink reference signal via a transmit beam of the base station 105-*a* and, as such, the UE 115-*a* may maintain current performance statistics for each beam 210 supported by the UE 115-*a* for each transmit beam used by the base station 105-*a*. Accordingly, the UE 115-*a* may maintain current knowledge of which beams 210 will provide (or will likely provide) a greatest receive beam strength for a transmit beam used by the base station 105-*a*, even in examples in which downlink reference signals transmitted via the transmit beams of the base station 105-*a* follow communication paths 205 (such as NLoS communication paths) that diverge from the offline electric field measurements.

As such, in examples in which the UE 115-*a* independently selects, for the first downlink reference signal, the beam 210-*a* and the beam 210-*c* based on the historical information stored at the UE 115-*a*, the UE 115-*a* may measure a receive strength, such as an SNR or an RSRP, of the first downlink reference signal on both of the beam 210-*a* and the beam 210-*c*. In some implementations, the UE 115-*a* may measure a first receive strength of the first downlink reference signal on the beam 210-*a* and a second receive strength of the first downlink reference signal on the beam 210-*c* and may average the first receive strength and the second receive strength to determine the receive strength (e.g., the SNR or the RSRP) of the first downlink reference signal. The UE 115-*a*, based on measuring or otherwise determining the receive strength of the first downlink reference signal on both of the beam 210-*a* and the beam 210-*c*, may generate a beam report based on the measurements. In some cases, the beam report may include an indication of the first downlink reference signal and the measured receive strength of the first downlink reference signal (which may be an average or a mean of the first receive strength and the second receive strength measured on the beam 210-*a* and the beam 210-*c*, respectively, or may be one or both of the first receive strength or the second receive strength) and the beam report may identify the beam 210-*a* and the beam 210-*c* explicitly or implicitly based on the indicated measured receive signal strength.

For instance, in some examples, based on independently selecting the beam 210-*a* and the beam 210-*c* (e.g., two servings beams) for measurement of the first downlink reference signal, the measured receive strength or RSRP of the first downlink reference signal may be greater than a second receive strength or RSRP associated with the use of a pre-configured beam pair. In other words, based on independently selecting beams 210 for measurement of the first downlink reference signal on a per-polarization basis, the UE 115-*a* may measure the first downlink reference signal at a higher receive strength (or RSRP) than the UE 115-*a* may have otherwise measured the first downlink reference signal if the UE 115-*a* had selected beams 210 according to a pre-configured beam pair.

In an example, for instance, the UE 115-*a* may configure or otherwise operate two beams 210, including an "a" beam and a "b" beam, with two polarizations per beam 210 (e.g., a polarization 215 and a polarization 220). In examples in which the two beams 210 are associated with a vertical polarization and a horizontal polarization, the different polarizations of the two beams 210 may be referred to as an "a_H" beam (e.g., the "a" beam having a horizontal polarization), an "a_V" beam (e.g., the "a" beam having a vertical polarization), a "b_H" beam (e.g., the "b" beam having a horizontal polarization), and a "b_V" beam (e.g., the "b" beam having a vertical polarization). In some cases, the (a_H, a_V) beam pair and the (b_H, b_V) beam pair may be examples of pre-determined or pre-configured beam pairs based on offline electric field measurements. In some implementations of the present disclosure, the UE 115-*a* may determine that, for a downlink reference signal from the base station 105-*a*, the "a_H" beam and the "b_V" beam may each receive a relatively high power or RSRP (and, in some examples, may receive an equivalently high power or RSRP) and the UE 115-*a* may determine that, for the same downlink reference signal, the "a_V" beam and the "b_H" beam receive a relatively lower power or RSRP (such as, for example, at least more than 20 dB lower).

Accordingly, in cases in which the UE 115-*a* employs a collapsing function to determine the mean RSRP for a beam report and in which the UE 115-*a* uses either of the pre-configured (a_H, a_V) or (b_H, b_V) beam pairs, the reported RSRP for either case (for measurement of the downlink signal reference signal on either the (a_H, a_V) beam pair or the (b_H, b_V) beam pair) will be lower than the measured RSRP for the "a_H" beam or the "b_V" beam, respectively. Alternatively, in some implementations of the present disclosure, the UE 115-*a* may employ the same collapsing function to determine the mean RSRP for a beam report but may use an independently selected (a_H, b_V) beam pair (as such beams 210 may provide a greatest received beam strength relative to others of their respective polarizations). As such, the reported RSRP based on use of the (a_H, b_V) beam pair will be relatively greater than the reported RSRP based on use of either of the (a_H, a_V) or (b_H, b_V) beam pairs.

For instance, in examples in which the "a_V" beam and the "b_H" beam have RSRPs more than 20 dB lower than the RSRPs measured for the a_H" beam and the "b_V" beam, the reported RSRPs for the (a_H, a_V) beam pair (which may be understood as the mean(a_H, a_V)) or the (b_H, b_V) beam pair (which may be understood as the mean(b_H, b_V)) may be at least 10 dB lower than the reported RSRP for the (a_H, b_V) beam pair. Further, in examples in which the "a_H" beam and the "b_V" beam receive equivalent or nearly equivalent RSRPs, the reported RSRP value for the (a_H, b_V) beam pair may be approximately equal to the RSRP measured by the "a_H" beam or the "b_V" beam. Accordingly, based on implementing the described techniques, the reporting of beam measurements for transmit beams used by the base station 105-*a* may become more balanced between the horizontally polarized and the vertically polarized beams and may provide greater receive strengths at the UE 115-*a*.

The UE 115-*a*, based on generating the beam report that identifies the beam 210-*a* and the beam 210-*c* and that includes the measured receive strength (e.g., the determined RSRP) of the first downlink reference signal, may transmit the beam report to the base station 105-*a*. In some implementations, the UE 115-*a* and the base station 105-*a* may determine that the beam 210-*a* and the beam 210-*c* provide a sufficiently great receive strength (e.g., a receive strength above a threshold receive strength) for the first downlink reference signal and the UE 115-*a* may communicate with (e.g., transmit to or receive signaling from) the base station 105-*a* using the beam 210-*a* and the beam 210-*c*. Likewise, the base station 105-*a* may communicate with (e.g., transmit to or receiving signaling from) the UE 115-*a* using a beam that the base station 105-*a* used to transmit the first downlink reference signal. Additionally or alternatively, the UE 115-*a* may select a beam for the base station 105-*a* to use for communication with the UE 115-*a* based on the imbalance between the receive beam strength measured for the beam 210-*a* and the receive beam strength measured for the beam 210-*c*.

Further, although FIG. 2 illustrates a downlink-led search and measurement procedure in which the base station 105-*a* transmits one or more downlink reference signals and the UE 115-*a* measures each of the one or more downlink reference signals on a pair of beams that are independently selected (independently selected on a per-polarization basis) for each of the one or more downlink reference signals, the described techniques may similarly apply to uplink-led search and measurement procedures in which the UE 115-*a* transmits one or more uplink reference signals to the base station 105-*a*. In such examples, the UE 115-*a* may transmit each of a number of uplink reference signals, such as a number of SRSs, via a transmit beam pair that is dynamically and independently selected on a per-polarization basis for each uplink reference signal.

For example, for a first uplink reference signal, the UE 115-*a* may select, from a beamforming codebook, the beam 210-*a* from the first set of beams 210 associated with the polarization 215 and the beam 210-*c* from the second set of beams 210 associated with the polarization 220 based on identifying that the beam 210-*a* and the beam 210-*c* will provide (or will likely provide) a greatest receive beam strength at the base station 105-*a* for the uplink reference signal relative to a remainder of the first set of beams 210 and the second set of beams 210, respectively. In some examples, the UE 115-*a* may determine that the beam 210-*a* and the beam 210-*c* will provide (or will likely provide) the greatest receive beam strength at the base station 105-*a* for the uplink reference signal based on historical information (such as beamforming statistics or performance statistics) stored at the UE 115-*a*, as similarly described in the context of a downlink-led search and measurement procedure.

In some implementations, the UE 115-*a* may maintain or update the historical information based on transmitting uplink reference signals via a number of transmit beam pairs (in which each beam 210 in a transmit beam pair is independently selected per-polarization) and receiving feedback from the base station 105-*a* associated with each of the number of transmit beam pairs. In some other implementations, the UE 115-*a* may maintain or update the historical information based on receiving downlink reference signals via a number of receive beam pairs (in which each beam 210 in a receive beam pair is independently selected per-polarization). In such implementations, for example, the UE 115-*a* may select to use the beam 210-*a* and the beam 210-*c* for transmission of the first uplink reference signal based on performance statistics associated with measured receive strengths using the beam 210-*a* and the beam 210-*c* to receive a downlink reference signal. In other words, the UE 115-*a* may assume a reciprocity or correspondence between a receive strength at the UE 115-*a* for a downlink reference signal measured on a beam 210 and a receive strength measured at the base station 105-*a* for an uplink reference signal transmitted to the base station 105-*a* using the same beam 210 (e.g., a suitable beam 210 for downlink may be a suitable beam 210 for uplink).

The base station 105-*a* may receive the uplink reference signal transmitted from each of the beam 210-*a* and the beam 210-*c*, may measure a received beam strength (such as an SNR or an RSRP) for the uplink reference signal, and may transmit a beam report to the UE 115-*a* including the measured receive beam strength based on receiving the uplink reference signal. In some implementations, the UE 115-*a* and the base station 105-*a* may determine that the beam 210-*a* and the beam 210-*c* provide a sufficiently great receive strength (e.g., a receive strength above a threshold receive strength) at the base station 105-*a* and the UE 115-*a* may communicate with (e.g., transmit to or receive signaling from) the base station 105-*a* using the beam 210-*a* and the beam 210-*c*. Likewise, the base station 105-*a* may communicate with (e.g., transmit to or receiving signaling from) the UE 115-*a* using a beam that the base station 105-*a* used to receive the first uplink reference signal. Additionally or alternatively, the UE 115-*a* or the base station 105-*a* may select a beam for the base station 105-*a* to use for communication with the UE 115-*a* based on the imbalance between the receive beam strength measured for the beam 210-*a* and the receive beam strength measured for the beam 210-*c*.

As such, the UE 115-*a* may employ such dynamic and independent selection of beams 210 on a per-polarization basis for transmitting or receiving reference signals to or from the base station 105-*a*. In some examples, based on such independent selection of beams 210 on a per-polarization basis, the UE 115-*a* may run a search and measurement procedure independently per-polarization for each transmission occasion of the search and measurement procedure. Accordingly, the UE 115-*a* may schedule different beam pairs for different transmission occasions based on selecting beams 210 per-polarization based on the reference signal (and its corresponding beam direction) scheduled for the different transmission occasions. Additional details relating to such beam scheduling across multiple transmission occasions based on per-polarization beam selection are described herein, including with reference to FIG. 3.

Further, although described herein from the perspective of the UE 115-*a*, a base station 105-*a* may similarly select beams 210 for communication with the UE 115-*a* independently on a per-polarization basis. Further, although described in the context of horizontal and vertical polarizations, the described techniques may also apply for slant polarizations, circular polarizations, or any other polarizations that a device may use. For instance, in examples in which the UE 115-*a* independently selects a beam 210 for each different slant polarization, the UE 115-*a* may select a first beam 210 from a first set of beams 210 associated with a +45 degree polarization and may independently select a second beam 210 from a second set of beams 210 associated with a −45 degree polarization. Additionally or alternatively, in examples in which the UE 115-*a* independently selects a beam from 210 for each different circular polarization, the UE 115-*a* may select a first beam 210 from a first set of beams 210 associated with a left hand circular polarization and may independently select a second beam 210 from a second set of beams 210 associated with a right hand circular polarization.

Figure 3:
FIG. 3 show examples of beam scheduling diagrams that support techniques for per-polarization beam scheduling for MIMO communication in accordance with aspects of the present disclosure.
Figure 3:

FIG. 3 shows examples of beam scheduling diagrams 300 and 301 that support techniques for per-polarization beam scheduling for MIMO communication in accordance with aspects of the present disclosure. The beam scheduling diagram 300 may illustrate beam scheduling according to pre-configured beam pairs and the beam scheduling diagram 301 may illustrate beam scheduling according to independent selection of two beams on a per-polarization basis. For example, in some implementations of the present disclosure, a UE 115 may select a first beam from a first set of beams associated with a first polarization (such as a horizontal polarization) and may independently select a second beam from a second set of beams associated with a second polarization (such as a vertical polarization) for search and measurement of a downlink reference signal received from a base station 105.

For example, the UE 115 and the base station 105 may perform or otherwise participate in a search and measurement procedure in which the base station 105 transmits a number of downlink reference signals via a corresponding number of transmit beams over a number of transmission occasions, such as TTIs. As shown in the beam scheduling diagrams 300 and 301, the base station 105 may transmit a first downlink reference signal via a transmit beam "0" over a first transmission occasion, a second downlink reference signal via a transmit beam "1" over a second transmission occasion, a third downlink reference signal via a transmit beam "2" over a third transmission occasion, and a fourth downlink reference signal via a transmit beam "3" over a fourth transmission occasion.

In some aspects, the downlink reference signals transmitted by the base station 105 may be SSBs, and each SSB may include a beam index (indicating the direction from which it was transmitted by the base station 105) and the beam index may correspond to the transmission occasion over which the SSB is transmitted. In the context of the beam scheduling diagrams 300 and 301, the first downlink reference signal may include a beam index indicating the transmit beam "0" over which the first downlink reference signal is transmitted, the second downlink reference signal may include a beam index indicating the transmit beam "1" over which the second downlink reference signal is transmitted, and so on. Further, in examples in which the downlink reference signals are SSBs, a transmission occasion for a transmit beam may repeat in time, such as every 20 ms.

The UE 115-*a* may receive the various downlink reference signals from the base station 105-*a* using different receive beam pairs, each receive beam pair including a horizontally polarized beam (an H beam) and a vertically polarized beam (a V beam). In some cases, the UE 115 may select receive beam pairs from a set of pre-configured receive beam pairs for measuring the various downlink reference signals. For example, the UE 115 may be pre-configured with a (1H, 1V) beam pair, a (2H, 2V) beam pair, a (3H, 3V) beam pair, and a 4H, 4V) beam pair. Accordingly, the UE 115 may select to use one of the pre-configured beam pairs for each transmission occasion and may measure the received downlink reference signal on both beams of the selected receive beam pair. As shown in the beam scheduling diagram 300, the UE 115 may select to measure the first downlink reference signal transmitted from the base station 105 via the transmit beam "0" with the (1H, 1V) beam pair, the second downlink reference signal transmitted from the base station 105 via the transmit beam "1" with the (3H, 3V) beam pair, the third downlink reference signal transmitted from the base station 105 via the transmit beam "2" with the (4H, 4V) beam pair, and the fourth downlink reference signal transmitted from the base station 105 via the transmit beam "3" with the (2H, 2V) beam pair.

In some implementations, the UE 115 may independently select the differently polarized beams on which the UE 115 may measure a downlink reference signal (e.g., as opposed to selecting a pre-configured beam pair). For example, for each downlink reference signal, the UE 115 may select a beam from the set of beams associated with a horizontal polarization (e.g., the set of beams 1H, 2H, 3H, and 4H) based on which beam of the set of horizontally polarized beams has a greatest receive beam strength for that downlink reference signal relative to a remainder of the set of horizontally polarized beams (e.g., the UE 115 may select one of the beams 1H, 2H, 3H, or 4H based on which of the beams 1H, 2H, 3H, and 4H has a greatest receive beam strength for the downlink reference signal). Additionally, for each downlink reference signal, the UE 115 may independently select a beam from the set of beams associated with a vertical polarization (e.g., the set of beams 1V, 2V, 3V, and 4V) based on which of the set of vertically polarized beams has a greatest receive beam for that downlink reference signal relative to a remainder of the set of vertically polarized beams (e.g., the UE 115 may select one of the beams 1V, 2V, 3V, or 4V based on which of the beams 1V, 2V, 3V, and 4V has a greatest receive beam strength for the downlink reference signal). Additional details relating to such independent selection of beams on a per-polarization basis are described herein, including with reference to FIG. 2.

As shown in the beam scheduling diagram 301, the UE 115 may select to measure the first downlink reference signal transmitted from the base station 105 via the transmit beam "0" with a (1H, 4V) beam pair, the second downlink reference signal transmitted from the base station 105 via the transmit beam "1" with a (3H, 2V) beam pair, the third downlink reference signal transmitted from the base station 105 via the transmit beam "2" with the (4H, 1V) beam pair, and the fourth downlink reference signal transmitted from the base station 105 via the transmit beam "3" with a (2H, 3V) beam pair. In other words, the UE 115 may determine that the 1H beam and the 4V beam each have a greatest receive beam strength for the first downlink reference signal (or the transmit beam "0") relative to the remainder of the horizontally polarized beams and vertically polarized beams, respectively, that the 3H beam and the 2V beam each have a greatest receive beam strength for the second downlink reference signal (or the transmit beam "1") relative to the remainder of the horizontally polarized beams and vertically polarized beams, respectively, that the 4H beam and 1V beam each have a greatest receive beam strength for the third downlink reference signal (or the transmit beam "2") relative to the remainder of the horizontally polarized beams and vertically polarized beams, respectively, and that the 2H beam and the 3V beam each have a greatest receive beam strength for the fourth downlink reference signal (or the transmit beam "3") relative to the remainder of the horizontally polarized beams and vertically polarized beams, respectively.

In other words, for each search and measurement occasion, the UE 115 may pick or otherwise select an H-pol analog beam and a V-pol analog beam to schedule independently. Additionally, based on implementing the scheduling techniques as shown in the beam scheduling diagram 301, the UE 115 may find or track a suitable beam pair (e.g., a beam pair that provides a greatest receive beam strength without large imbalance between the two beams) in one transmission occasion, while implementing the scheduling techniques as shown in the beam scheduling diagram 300 may use two transmission occasions. For example, the beam scheduling diagram 300 may use two transmission occasions because, for a transmit beam, the UE 115 may measure the transmit beam using a first pre-configured beam pair to identify a horizontally polarized beam during a first transmission occasion and may measure the transmit beam using a second pre-configured beam pair to identify a vertically polarized beam during a second transmission occasion, which may occur 20 ms later.

Such relatively greater latency (using two transmission occasions instead of one) may result in an inability to track the mobility of the UE 115 or may consume more power (as the UE 115 may search and measure more reference signals over more transmission occasions to identify the suitable beam pair). Accordingly, based on implementing the techniques of the present disclosure, the UE 115 may support improved mobility tracking and power savings at the UE 115 by using fewer search and measurement resources to detect or track on suitable beam pairs (e.g., suitable 2-pol beam pairs). For example, for some transmission occasions associated with a transmit beam for which the UE 115 has previously identified a beam pair, the UE 115 may enter a sleep mode for the duration of the transmission occasion and refrain from measuring the corresponding downlink reference signal, which may improve power savings at the UE 115. The UE 115 may implement such techniques for discontinuous reception (DRX) or a connected mode DRX (CDRX) scenarios, such as for beam panic design in CDRX.

Further, although described in the context of a downlink-led search and measurement procedure, the UE 115 may similarly select one horizontally polarized beam from the set of beams 1H, 2H, 3H, and 4H and may independently select one vertically polarized beam from the set of beams 1V, 2V, 3V, and 4V for transmission of an uplink reference signal to the base station 105. In such examples of an uplink-led search and measurement procedure, the UE 115 may select the one horizontally polarized beam and the one vertically polarized beam for transmission of the uplink transmission based on independently identifying or otherwise determining which horizontally polarized beam and which vertically polarized beam provide (or will likely provide) a greatest receive beam strength at the base station 105 based on historical information, as described in more detail with reference to FIG. 2.

Figure 4:
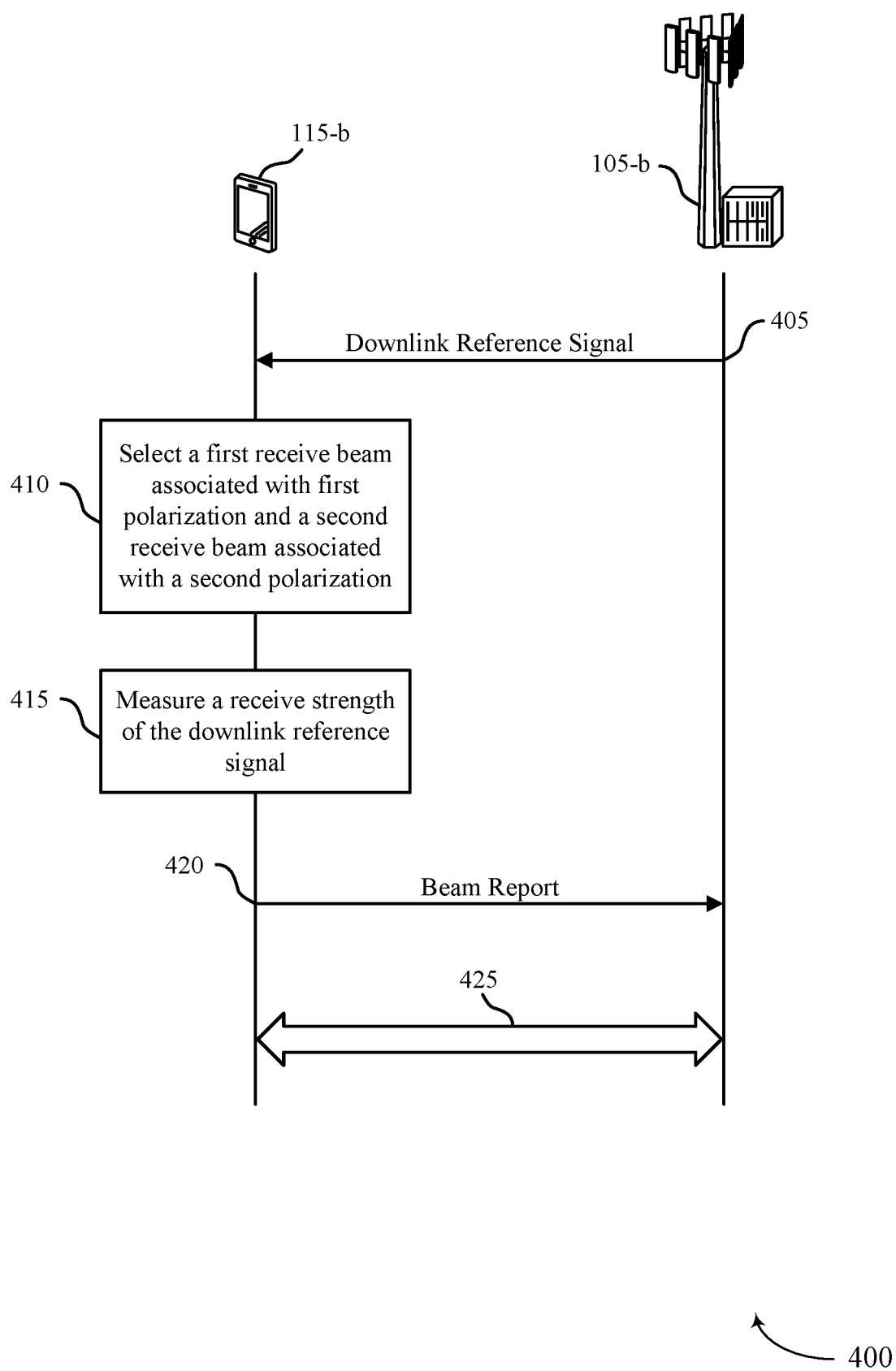
FIGS. 4 and 5 show examples of process flows that support techniques for per-polarization beam scheduling for MIMO communication in accordance with aspects of the present disclosure.

FIG. 4 shows an example of a process flow 400 that supports techniques for per-polarization beam scheduling for MIMO communication in accordance with aspects of the present disclosure. The process flow 400 may be implement aspects of the wireless communications system 100 or the wireless communications system 200. For example, the process flow 400 illustrates communication between a UE 115-b and a base station 105-b, which may be examples of corresponding devices described herein, including with reference to FIGS. 1 and 2. In some examples, the UE 115-b may independently select a first beam associated with a first polarization and a second beam associated with a second polarization for measurement of a downlink reference signal received from the base station 105-b.

At 405, the UE 115-b may receive a downlink reference signal from the base station 105-b. In some examples, the downlink reference signal may be an SSB and may include a beam index corresponding to a transmission occasion, such as a TTI, over which the base station 105-b transmits the downlink reference signal. In some aspects, the base station 105-b may transmit the downlink reference signal as part of a search and measurement procedure. In some aspects, the UE 115-b may receive the downlink reference signal from the base station 105-b via at least one NLoS communication path.

At 410, the UE 115-b may select, from a beamforming codebook, a first receive beam and a second receive beam to be measured for receive beam strength with respect to the downlink reference signal. In some examples, the UE 115-b may select the first receive beam from a first set of beams associated with a first polarization (such as a horizontal polarization) and may select the second receive beam from a second set of beams associated with a second polarization (such as a vertical polarization). In some implementations, the UE 115-b may select the first receive beam independently of the second receive beam, and may select the first receive beam and the second receive beam based on the first receive beam and the second receive beam each having a greatest receive beam strength with respect to the downlink reference signal relative to a remainder of the first set of beams and the second set of beams, respectively. In some aspects, the UE 115-b may determine that the first receive beam and the second receive beam have the greatest receive beam strength relative to the remainder of the first set of beams and the second set of beams, respectively, based on historical information (e.g., beamforming statistics or performance statistics) stored at the UE 115-b.

At 415, the UE 115-b may measure a receive strength of the downlink reference signal on both the first receive beam and the second receive beam. In some examples, the measured receive strength (e.g., an RSRP value) may be greater relative to a second receive strength that the UE 115-b may measure if the UE 115-b uses a pre-configured beam pair.

At 420, the UE 115-b may transmit, to the base station 105-b, a beam report that identifies the first receive beam and the second receive beam. In some examples, the UE 115-b may include the measured receive strength (e.g., the RSRP value) in the beam report.

At 425, the UE 115-b and the base station 105-b may communicate based on the beam report. In some examples, for instance, the measured receive beam strength may satisfy a threshold receive beam strength (or be a greatest of a number of reported measured receive beam strengths) and the UE 115-b may communicate with (e.g., transmit or receive signaling to or from) the base station 105-b via the first receive beam and the second receive beam (which may also be used as transmit beams) and the base station 105-b may communicate with (e.g., transmit or receive signaling to or from) the UE 115-b via the transmit beam (which may also be used as a receive beam) corresponding to the beam index included in the downlink reference signal.

Additionally or alternatively, the UE 115-b may select a transmit beam for the base station 105-b to use for communication with the UE 115-b based on the imbalance between the receive beam strength measured for the first receive beam and the receive beam strength measured for the second receive beam. In other words, in examples in which the first and second polarizations refer to horizontal and vertical polarizations, the UE 115-b may refrain from selecting a base station 105-b transmit beam based exclusively on the greatest return of a max(H, V) function (e.g., which may return a value of the maximum of the measured beam strength between the H beam and the V beam) and may instead (or in addition) consider the imbalance observed between the H beam and the V beam for that transmit beam when determining which transmit beam the base station 105-b may use for communication with the UE 115-b. In some aspects, the UE 115-b and the base station 105-b may communicate via at least one NLoS communication path.

Figure 5:
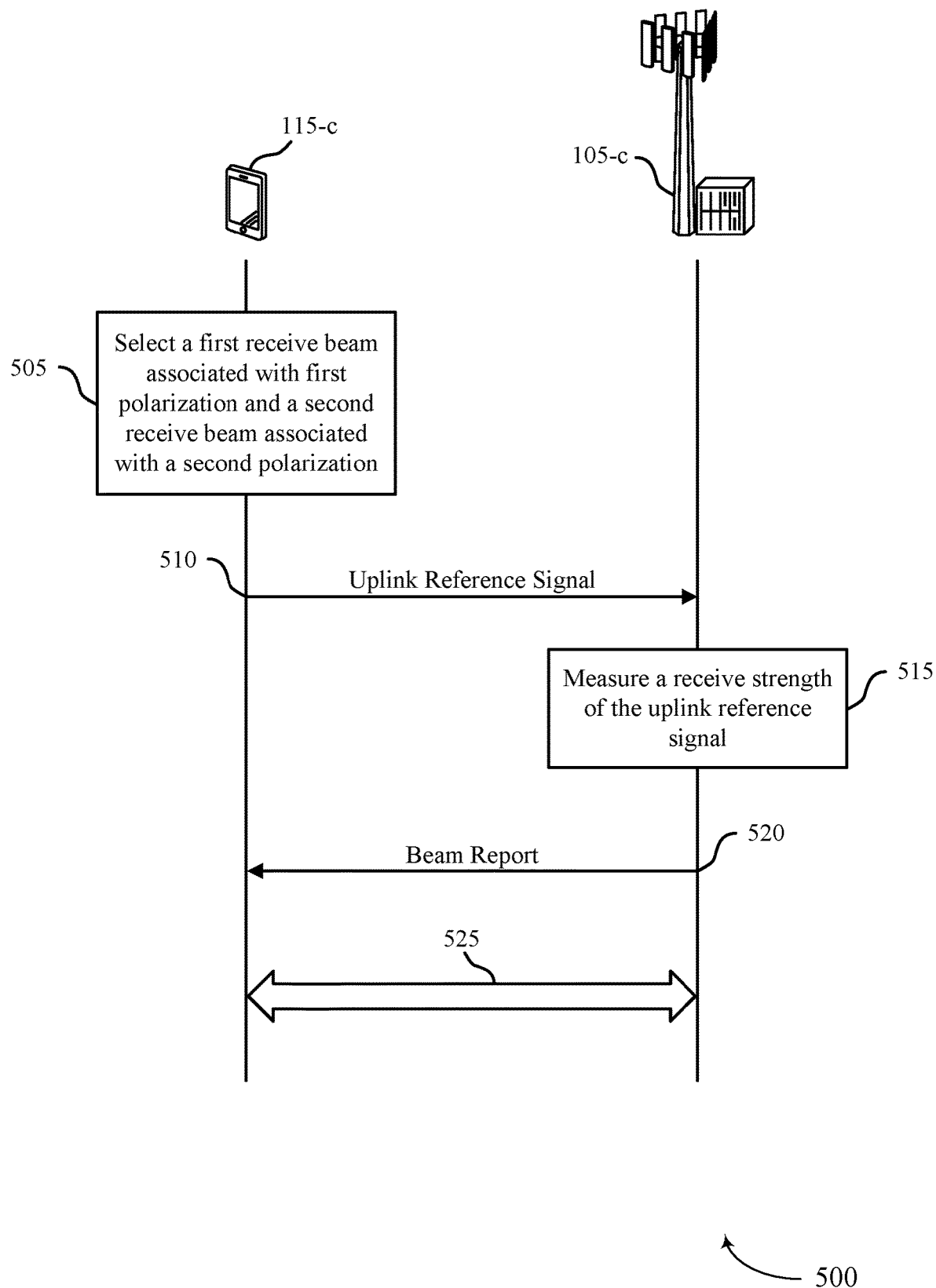

FIG. 5 shows an example of a process flow 500 that supports techniques for per-polarization beam scheduling for MIMO communication in accordance with aspects of the present disclosure. The process flow 500 may be implement aspects of the wireless communications system 100 or the wireless communications system 200. For example, the process flow 500 illustrates communication between a UE 115-c and a base station 105-c, which may be examples of corresponding devices described herein, including with reference to FIGS. 1 and 2. In some examples, the UE 115-c may independently select a first beam associated with a first polarization and a second beam associated with a second polarization for transmission of an uplink reference signal to the base station 105-c.

At 505, the UE 115-c may select, from a beamforming codebook, a first transmit beam and a second transmit beam for transmission of an uplink reference signal. In some examples, the UE 115-c may select the first transmit beam from a first set of beams associated with a first polarization (such as a horizontal polarization) and may select the second transmit beam from a second set of beams associated with a second polarization (such as a vertical polarization). In some implementations, the UE 115-c may select the first transmit beam independent of the second transmit beam, and may select the first transmit beam and the second transmit beam based on the first transmit beam and the second transmit beam each having a greatest receive beam strength at the base station 105-c relative to a remainder of the first set of beams and the second set of beams, respectively. In some aspects, the UE 115-c may determine that the first transmit beam and the second transmit beam have the greatest receive beam strength at the base station 105-c relative to the remainder of the first set of beams and the second set of beams, respectively, based on historical information (e.g., beamforming statistics or performance statistics) stored at the UE 115-c.

At 510, the UE 115-c may transmit the uplink reference signal to the base station 105-c via both the first transmit beam and the second transmit beam. In some examples, the uplink reference signal may be an SRS. In some aspects, the base station 105-c may receive the uplink reference signal from the UE 115-c via at least one NLoS communication path.

At 515, the base station 105-c may measure a receive strength of the uplink reference signal using one or more receive beams at the base station 105-c. In some examples, the measured receive strength (e.g., an RSRP value) may be greater than a second receive strength that the base station 105-c may measure if the UE 115-b transmits the uplink reference signal via a pre-configured beam pair.

At 520, the UE 115-c may receive, from the base station 105-c, a beam report based on the transmission of the uplink reference signal via the first transmit beam and the second transmit beam. In some examples, the beam report may include the measured receive strength (e.g., the RSRP value).

At 525, the UE 115-c and the base station 105-c may communicate based on the beam report. In some examples, for instance, the measured receive strength may satisfy a threshold receive strength (or be a greatest of a number of reported receive strengths) and the UE 115-c may communicate with (e.g., transmit or receive signaling to or from) the base station 105-c via the first transmit beam and the second transmit beam (which may also be used as receive beams) and the base station 105-c may communicate with (e.g., transmit or receive signaling to or from) the UE 115-c via a receive beam (which may also be used as a transmit beam) used by the base station 105-c to receive the uplink reference signal.

Additionally or alternatively, the UE 115-c may select a beam for the base station 105-c to use for communication with the UE 115-c based on the imbalance between the receive beam strength measured for the first transmit beam and the receive beam strength measured for the second transmit beam. In other words, in examples in which the first and second polarizations refer to horizontal and vertical polarizations, the UE 115-c may refrain from selecting a base station 105-c beam based exclusively on the greatest return of a max(H, V) function (e.g., which may return a value of the maximum of the measured beam strength between for the H beam and the V beam) and may instead (or in addition) consider the imbalance observed between the H beam and the V beam for that beam when determining which beam the base station 105-c may use for communication with the UE 115-c. In some aspects, the UE 115-c and the base station 105-c may communicate via at least one NLoS communication path.

Figure 6:
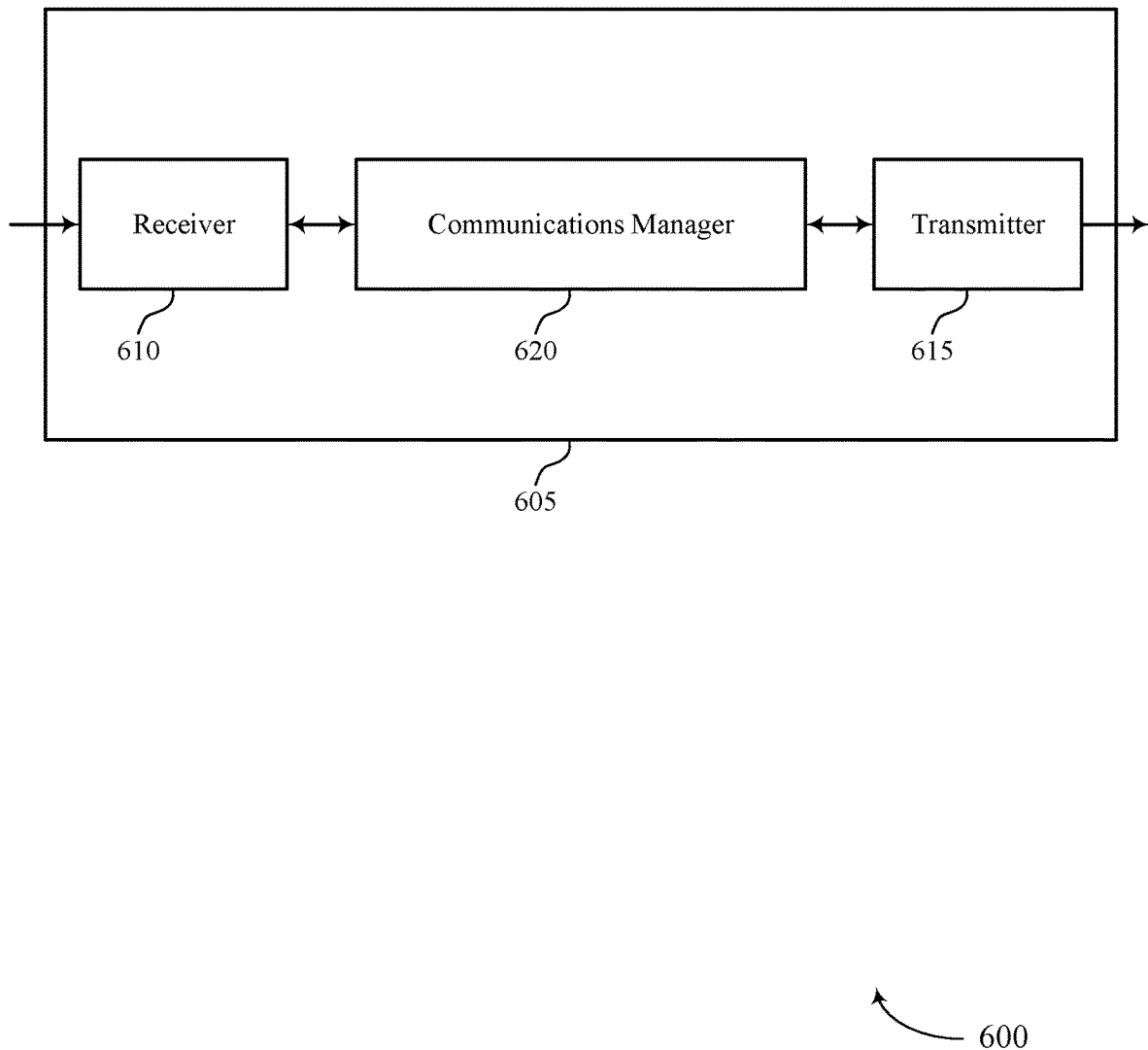
FIGS. 6 and 7 show diagrams of devices that support techniques for per-polarization beam scheduling for MIMO communication in accordance with aspects of the present disclosure.

FIG. 6 shows a diagram 600 of a device 605 that supports techniques for per-polarization beam scheduling for MIMO communication in accordance with aspects of the present disclosure. The device 605 may be an example of aspects of a UE 115 as described herein. In some examples, the device 605 may be an example of a modem. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for per-polarization beam scheduling for MIMO communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for per-polarization beam scheduling for MIMO communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for per-polarization beam scheduling for MIMO communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving a downlink reference signal from a base station. The communications manager 620 may be configured as or otherwise support a means for selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook. The communications manager 620 may be configured as or otherwise support a means for measuring a receive strength of the downlink reference signal on both the first receive beam and the second receive beam. The communications manager 620 may be configured as or otherwise support a means for transmitting, to the base station, a beam report that identifies the first receive beam and the second receive beam.

Additionally or alternatively, the communications manager 620 may support wireless communication at a UE in accordance with examples as disclosed herein. For example, the communications manager 620 may be configured as or otherwise support a means for selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook. The communications manager 620 may be configured as or otherwise support a means for transmitting the uplink reference signal to a base station via both the first transmit beam and the second transmit beam. The communications manager 620 may be configured as or otherwise support a means for receiving, from the base station, a beam report based on the transmission of the uplink reference signal via the first transmit beam and the second transmit beam.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources. For example, the device 605, based on independent beam selection per-polarization, may use fewer search and measurement resources, which may improve power savings and battery life at the device 605.

Figure 7:
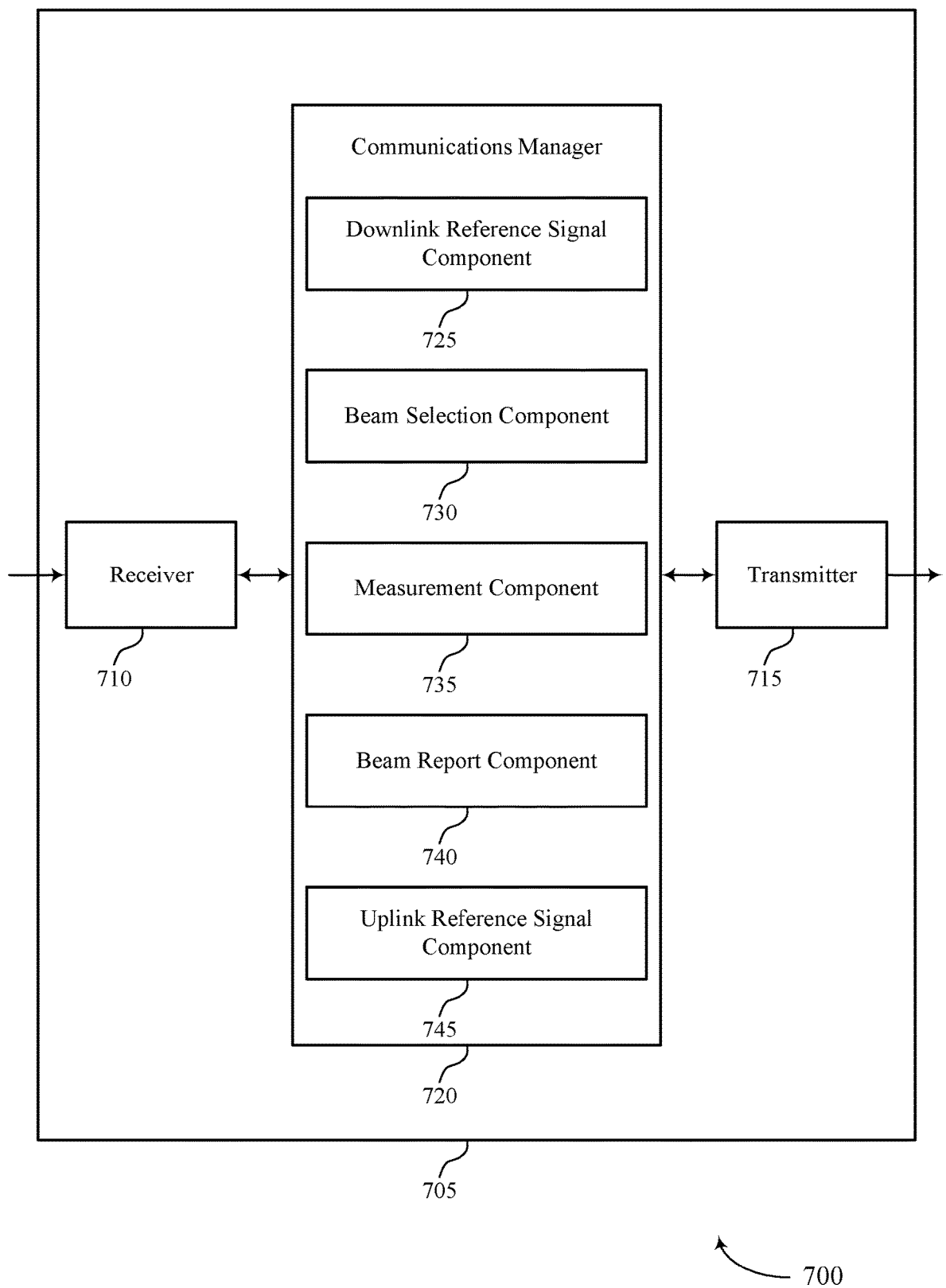

FIG. 7 shows a diagram 700 of a device 705 that supports techniques for per-polarization beam scheduling for MIMO communication in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for per-polarization beam scheduling for MIMO communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for per-polarization beam scheduling for MIMO communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for per-polarization beam scheduling for MIMO communication as described herein. For example, the communications manager 720 may include a downlink reference signal component 725, a beam selection component 730, a measurement component 735, a beam report component 740, an uplink reference signal component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The downlink reference signal component 725 may be configured as or otherwise support a means for receiving a downlink reference signal from a base station. The beam selection component 730 may be configured as or otherwise support a means for selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook. The measurement component 735 may be configured as or otherwise support a means for measuring a receive strength of the downlink reference signal on both the first receive beam and the second receive beam. The beam report component 740 may be configured as or otherwise support a means for transmitting, to the base station, a beam report that identifies the first receive beam and the second receive beam.

Additionally or alternatively, the communications manager 720 may support wireless communication at a UE in accordance with examples as disclosed herein. The beam selection component 730 may be configured as or otherwise support a means for selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook. The uplink reference signal component 745 may be configured as or otherwise support a means for transmitting the uplink reference signal to a base station via both the first transmit beam and the second transmit beam. The beam report component 740 may be configured as or otherwise support a means for receiving, from the base station, a beam report based on the transmission of the uplink reference signal via the first transmit beam and the second transmit beam.

Figure 8:
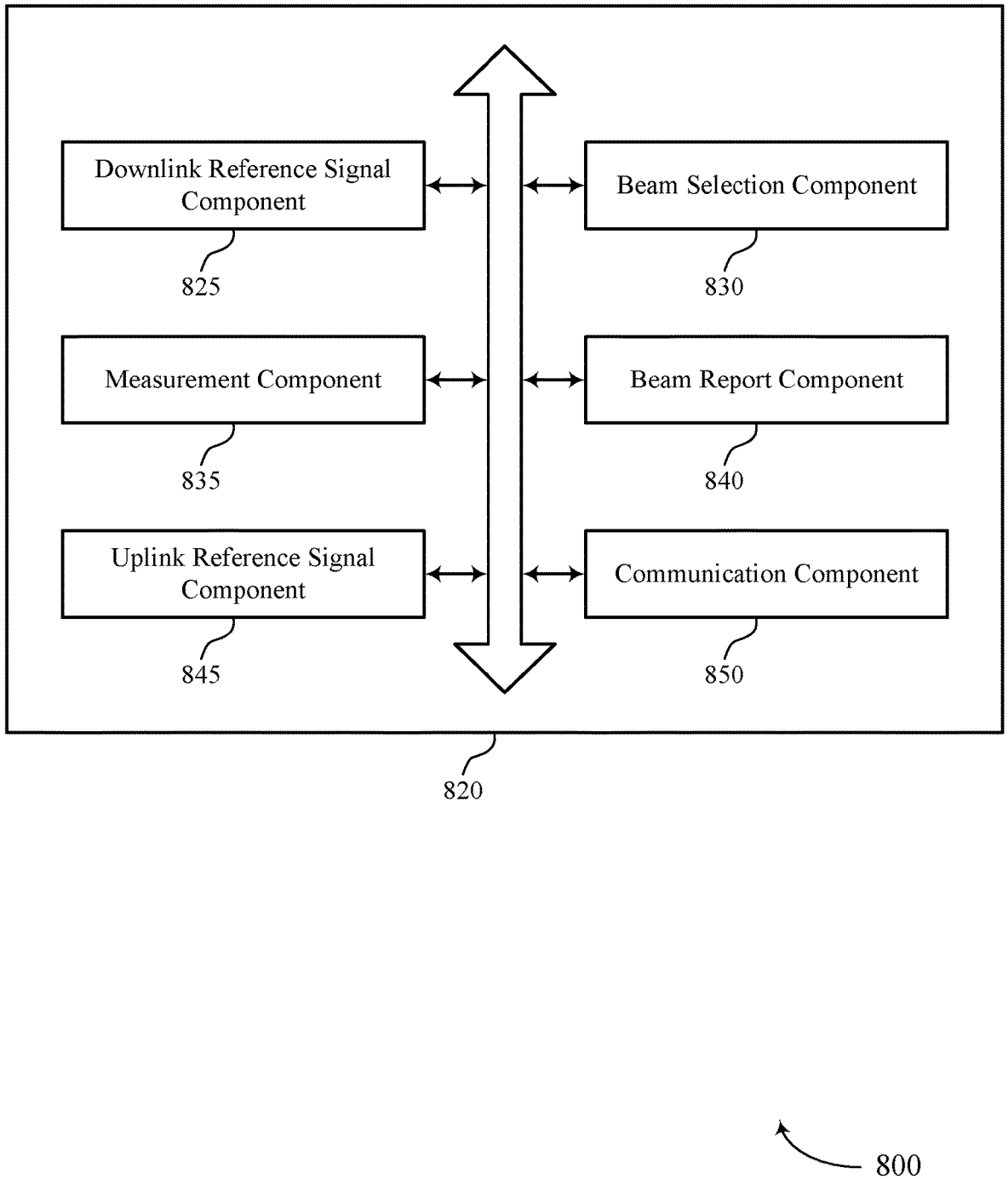
FIG. 8 shows a diagram of a communications manager that supports techniques for per-polarization beam scheduling for MIMO communication in accordance with aspects of the present disclosure.

FIG. 8 shows a diagram 800 of a communications manager 820 that supports techniques for per-polarization beam scheduling for MIMO communication in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for per-polarization beam scheduling for MIMO communication as described herein. For example, the communications manager 820 may include a downlink reference signal component 825, a beam selection component 830, a measurement component 835, a beam report component 840, an uplink reference signal component 845, a communication component 850, or any combination thereof. Each of these components may communicate, directly or indirectly, with one another (e.g., via one or more buses).

The communications manager 820 may support wireless communication at a UE in accordance with examples as disclosed herein. The downlink reference signal component 825 may be configured as or otherwise support a means for receiving a downlink reference signal from a base station. The beam selection component 830 may be configured as or otherwise support a means for selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook. The measurement component 835 may be configured as or otherwise support a means for measuring a receive strength of the downlink reference signal on both the first receive beam and the second receive beam. The beam report component 840 may be configured as or otherwise support a means for transmitting, to the base station, a beam report that identifies the first receive beam and the second receive beam.

In some examples, to support selecting the first receive beam and the second receive beam, the beam selection component 830 may be configured as or otherwise support a means for selecting the first receive beam independent of the second receive beam. In some examples, to support selecting the first receive beam and the second receive beam, the beam selection component 830 may be configured as or otherwise support a means for selecting one or both of the first receive beam and the second receive beam based on historical information stored at the UE.

In some examples, to support selecting the first receive beam and the second receive beam, the beam selection component 830 may be configured as or otherwise support a means for selecting the first receive beam from the first set of beams and the second receive beam from the second set of beams based on the first receive beam and the second receive beam each having a greatest receive beam strength with respect to the downlink reference signal relative to a remainder of the first set of beams and the second set of beams, respectively. In some examples, historical information stored at the UE indicates that the first receive beam and the second receive beam each have had the greatest receive beam strength with respect to the downlink reference signal relative to the remainder of the first set of beams and the second set of beams, respectively.

In some examples, the communication component 850 may be configured as or otherwise support a means for communicating with the base station via at least one non-line-of-sight communication path using one or both of the first receive beam and the second receive beam. In some examples, to support transmitting the beam report, the beam report component 840 may be configured as or otherwise support a means for including in the beam report an indication of a first RSRP value associated with use of the first receive beam and the second receive beam, where the first RSRP value is greater than a second RSRP value associated with use of a pre-configured receive beam pair.

In some examples, the first polarization includes a horizontal polarization and the second polarization includes a vertical polarization. In some examples, the downlink reference signal includes an SSB having a beam index which corresponds to a TTI. In some examples, the beamforming codebook is for MIMO communication. In some examples, the UE and the base station communicate over an mmW radio frequency spectrum band.

Additionally or alternatively, the communications manager 820 may support wireless communication at a UE in accordance with examples as disclosed herein. In some examples, the beam selection component 830 may be configured as or otherwise support a means for selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook. The uplink reference signal component 845 may be configured as or otherwise support a means for transmitting the uplink reference signal to a base station via both the first transmit beam and the second transmit beam. In some examples, the beam report component 840 may be configured as or otherwise support a means for receiving, from the base station, a beam report based on the transmission of the uplink reference signal via the first transmit beam and the second transmit beam.

In some examples, to support selecting the first transmit beam and the second transmit beam, the beam selection component 830 may be configured as or otherwise support a means for selecting the first transmit beam independent of the second transmit beam. In some examples, to support selecting the first transmit beam and the second transmit beam, the beam selection component 830 may be configured as or otherwise support a means for selecting one or both of the first transmit beam and the second transmit beam based on historical information stored at the UE.

In some examples, to support selecting the first transmit beam and the second transmit beam, the beam selection component 830 may be configured as or otherwise support a means for selecting the first transmit beam from the first set of beams and the second transmit beam from the second set of beams based on the first transmit beam and the second transmit beam each having a greatest received beam strength at the base station relative to a remainder of the first set of beams and the second set of beams, respectively. In some examples, historical information stored at the UE indicates that the first transmit beam and the second transmit beam each have the greatest received beam strength at the base station relative to the remainder of the first set of beams and the second set of beams, respectively.

In some examples, the communication component 850 may be configured as or otherwise support a means for communicating with the base station via at least one non-line-of-sight communication path using one or both of the first transmit beam and the second transmit beam. In some examples, to support receiving the beam report, the beam report component 840 may be configured as or otherwise support a means for identifying in the beam report an indication of a first RSRP value associated with use of the first transmit beam and the second transmit beam, where the first RSRP value is greater than a second RSRP value associated with use of a pre-configured transmit beam pair.

In some examples, the first polarization includes a horizontal polarization and the second polarization includes a vertical polarization. In some examples, the uplink reference signal includes an SRS. In some examples, the beamforming codebook is for MIMO communication. In some examples, the UE and the base station communicate over an mmW radio frequency spectrum band.

Figure 9:
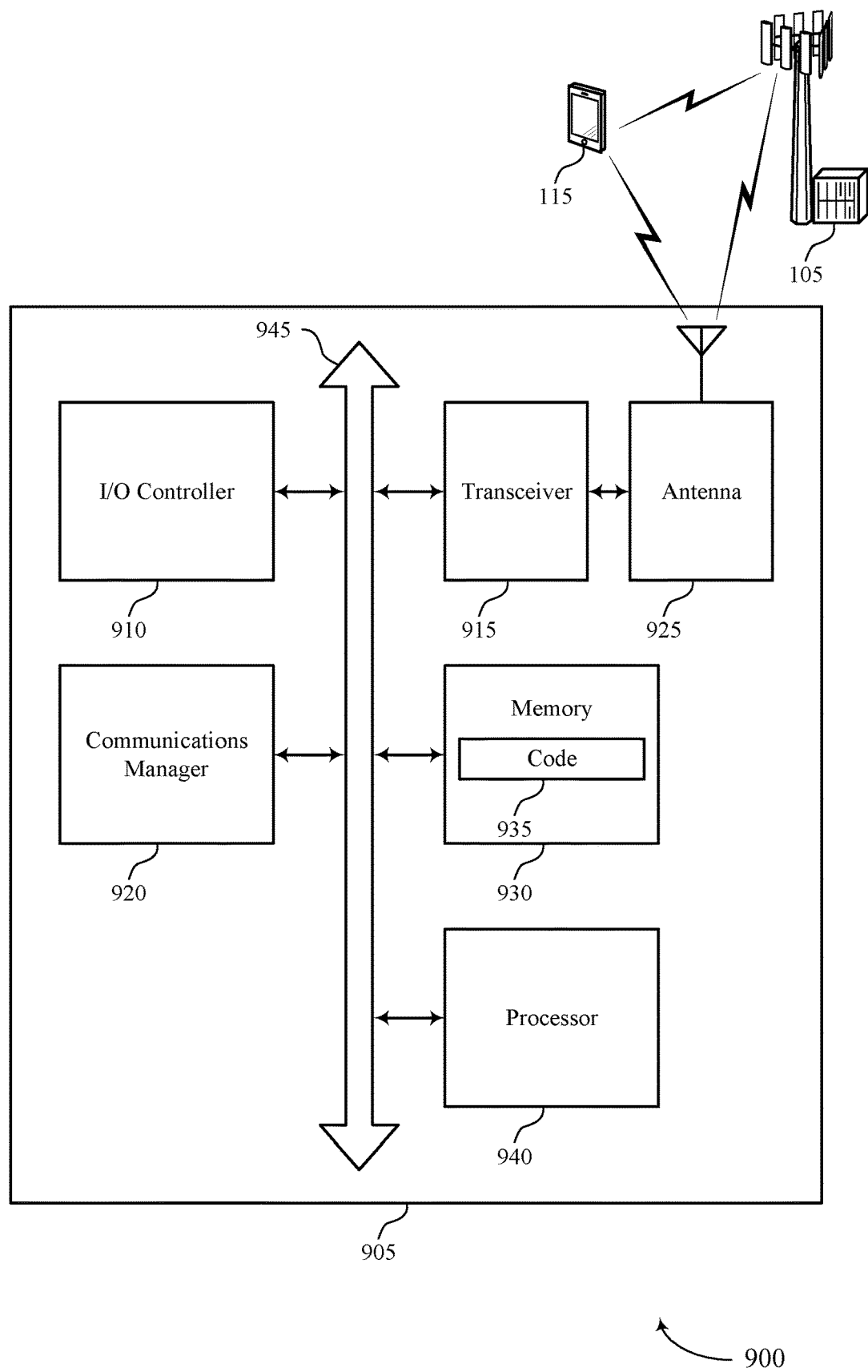
FIG. 9 shows a diagram of a system including a device that supports techniques for per-polarization beam scheduling for MIMO communication in accordance with aspects of the present disclosure.

FIG. 9 shows a diagram of a system 900 including a device 905 that supports techniques for per-polarization beam scheduling for MIMO communication in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for per-polarization beam scheduling for MIMO communication). For example, the device 905 or a component of the device 905 may include a processor 940 and memory 930 coupled with the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a downlink reference signal from a base station. The communications manager 920 may be configured as or otherwise support a means for selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook. The communications manager 920 may be configured as or otherwise support a means for measuring a receive strength of the downlink reference signal on both the first receive beam and the second receive beam. The communications manager 920 may be configured as or otherwise support a means for transmitting, to the base station, a beam report that identifies the first receive beam and the second receive beam.

Additionally or alternatively, the communications manager 920 may support wireless communication at a UE in accordance with examples as disclosed herein. For example, the communications manager 920 may be configured as or otherwise support a means for selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook. The communications manager 920 may be configured as or otherwise support a means for transmitting the uplink reference signal to a base station via both the first transmit beam and the second transmit beam. The communications manager 920 may be configured as or otherwise support a means for receiving, from the base station, a beam report based on the transmission of the uplink reference signal via the first transmit beam and the second transmit beam.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for per-polarization beam scheduling for MIMO communication as described herein, or the processor 940 and the memory 930 may be otherwise configured to perform or support such operations.

Figure 10:
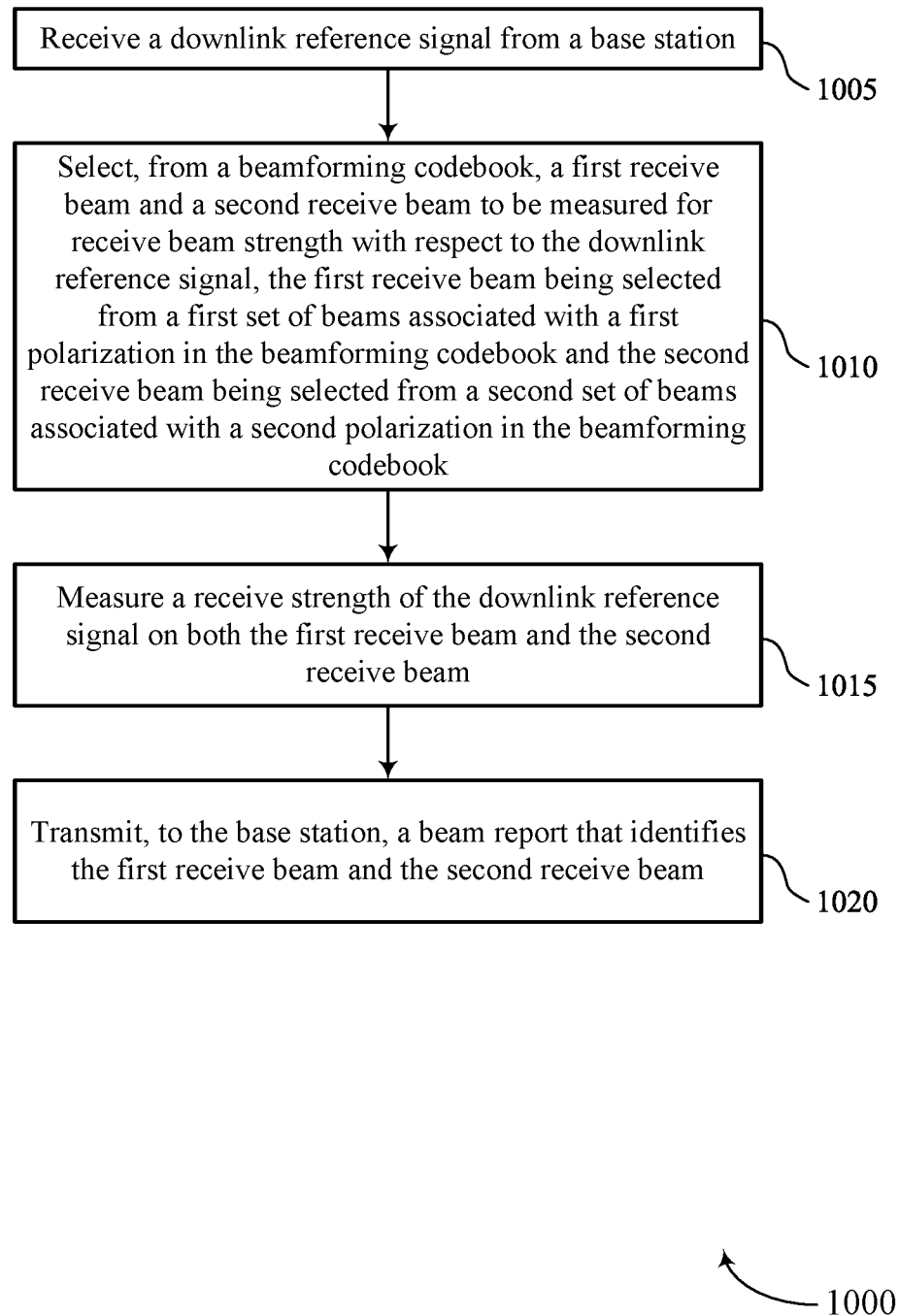
FIGS. 10 through 13 show flowcharts illustrating methods that support techniques for per-polarization beam scheduling for MIMO communication in accordance with aspects of the present disclosure.

FIG. 10 shows a flowchart illustrating a method 1000 that supports techniques for per-polarization beam scheduling for MIMO communication in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving a downlink reference signal from a base station. The operations of 1005 may be performed in accordance with examples as disclosed herein. In some examples, aspects of the operations of 1005 may be performed by a downlink reference signal component 825 as described with reference to FIG. 8.

At 1010, the method may include selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook. The operations of 1010 may be performed in accordance with examples as disclosed herein. In some examples, aspects of the operations of 1010 may be performed by a beam selection component 830 as described with reference to FIG. 8.

At 1015, the method may include measuring a receive strength of the downlink reference signal on both the first receive beam and the second receive beam. The operations of 1015 may be performed in accordance with examples as disclosed herein. In some examples, aspects of the operations of 1015 may be performed by a measurement component 835 as described with reference to FIG. 8.

At 1020, the method may include transmitting, to the base station, a beam report that identifies the first receive beam and the second receive beam. The operations of 1020 may be performed in accordance with examples as disclosed herein. In some examples, aspects of the operations of 1020 may be performed by a beam report component 840 as described with reference to FIG. 8.

Figure 11:
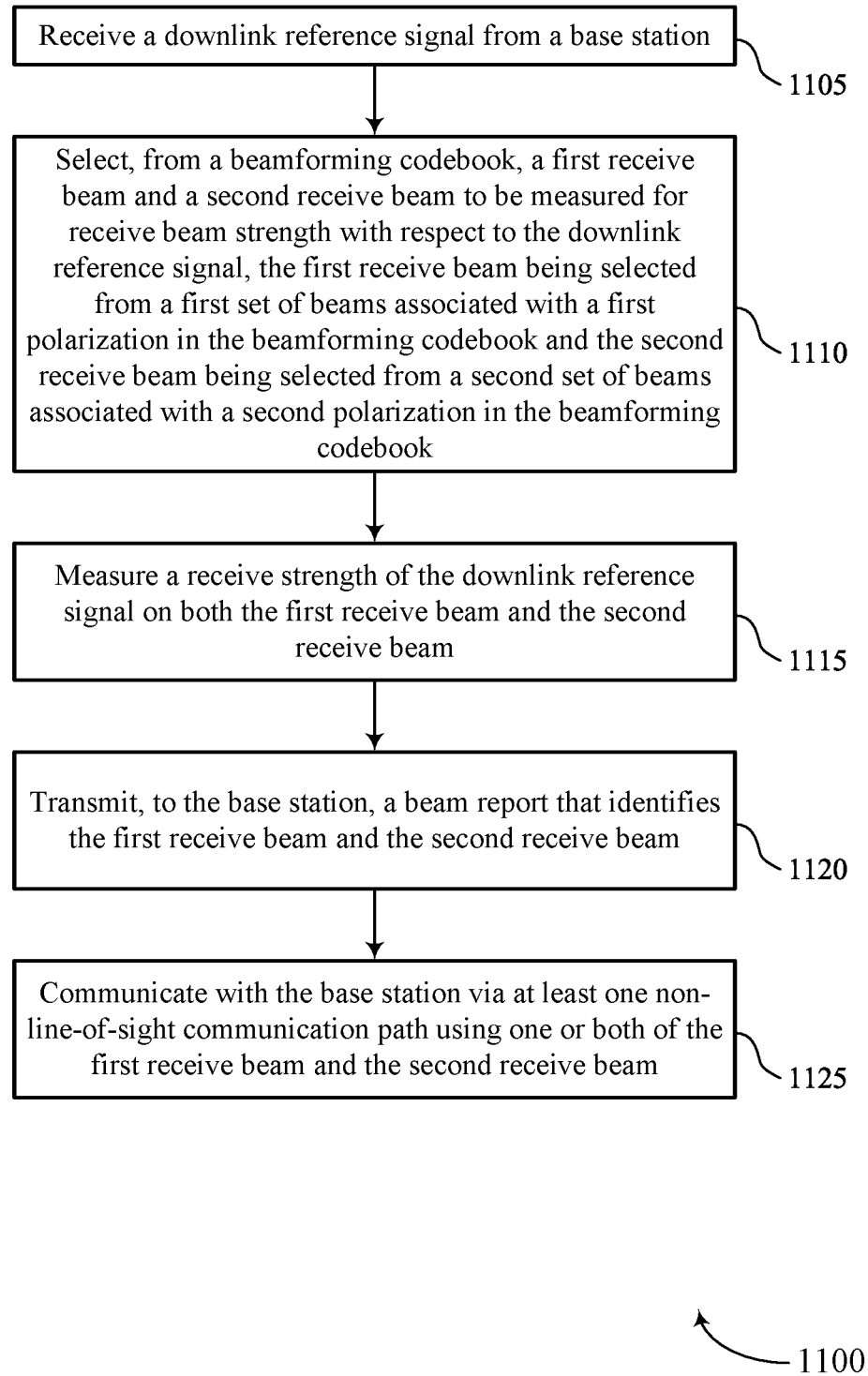

FIG. 11 shows a flowchart illustrating a method 1100 that supports techniques for per-polarization beam scheduling for MIMO communication in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving a downlink reference signal from a base station. The operations of 1105 may be performed in accordance with examples as disclosed herein. In some examples, aspects of the operations of 1105 may be performed by a downlink reference signal component 825 as described with reference to FIG. 8.

At 1110, the method may include selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook. The operations of 1110 may be performed in accordance with examples as disclosed herein. In some examples, aspects of the operations of 1110 may be performed by a beam selection component 830 as described with reference to FIG. 8.

At 1115, the method may include measuring a receive strength of the downlink reference signal on both the first receive beam and the second receive beam. The operations of 1115 may be performed in accordance with examples as disclosed herein. In some examples, aspects of the operations of 1115 may be performed by a measurement component 835 as described with reference to FIG. 8.

At 1120, the method may include transmitting, to the base station, a beam report that identifies the first receive beam and the second receive beam. The operations of 1120 may be performed in accordance with examples as disclosed herein. In some examples, aspects of the operations of 1120 may be performed by a beam report component 840 as described with reference to FIG. 8.

At 1125, the method may include communicating with the base station via at least one non-line-of-sight communication path using one or both of the first receive beam and the second receive beam. The operations of 1125 may be performed in accordance with examples as disclosed herein. In some examples, aspects of the operations of 1125 may be performed by a communication component 850 as described with reference to FIG. 8.

Figure 12:
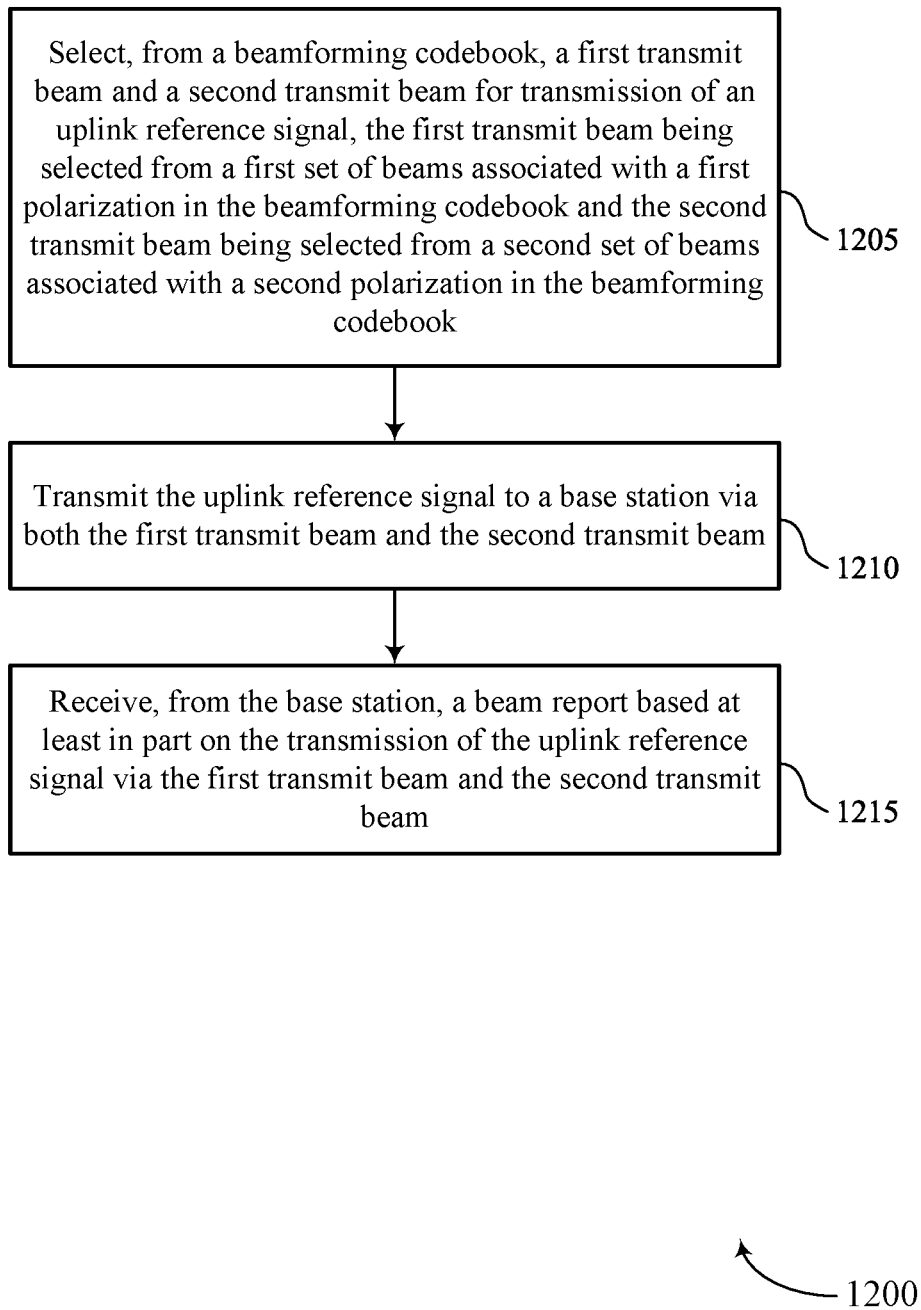

FIG. 12 shows a flowchart illustrating a method 1200 that supports techniques for per-polarization beam scheduling for MIMO communication in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook. The operations of 1205 may be performed in accordance with examples as disclosed herein. In some examples, aspects of the operations of 1205 may be performed by a beam selection component 830 as described with reference to FIG. 8.

At 1210, the method may include transmitting the uplink reference signal to a base station via both the first transmit beam and the second transmit beam. The operations of 1210 may be performed in accordance with examples as disclosed herein. In some examples, aspects of the operations of 1210 may be performed by an uplink reference signal component 845 as described with reference to FIG. 8.

At 1215, the method may include receiving, from the base station, a beam report based on the transmission of the uplink reference signal via the first transmit beam and the second transmit beam. The operations of 1215 may be performed in accordance with examples as disclosed herein. In some examples, aspects of the operations of 1215 may be performed by a beam report component 840 as described with reference to FIG. 8.

Figure 13:
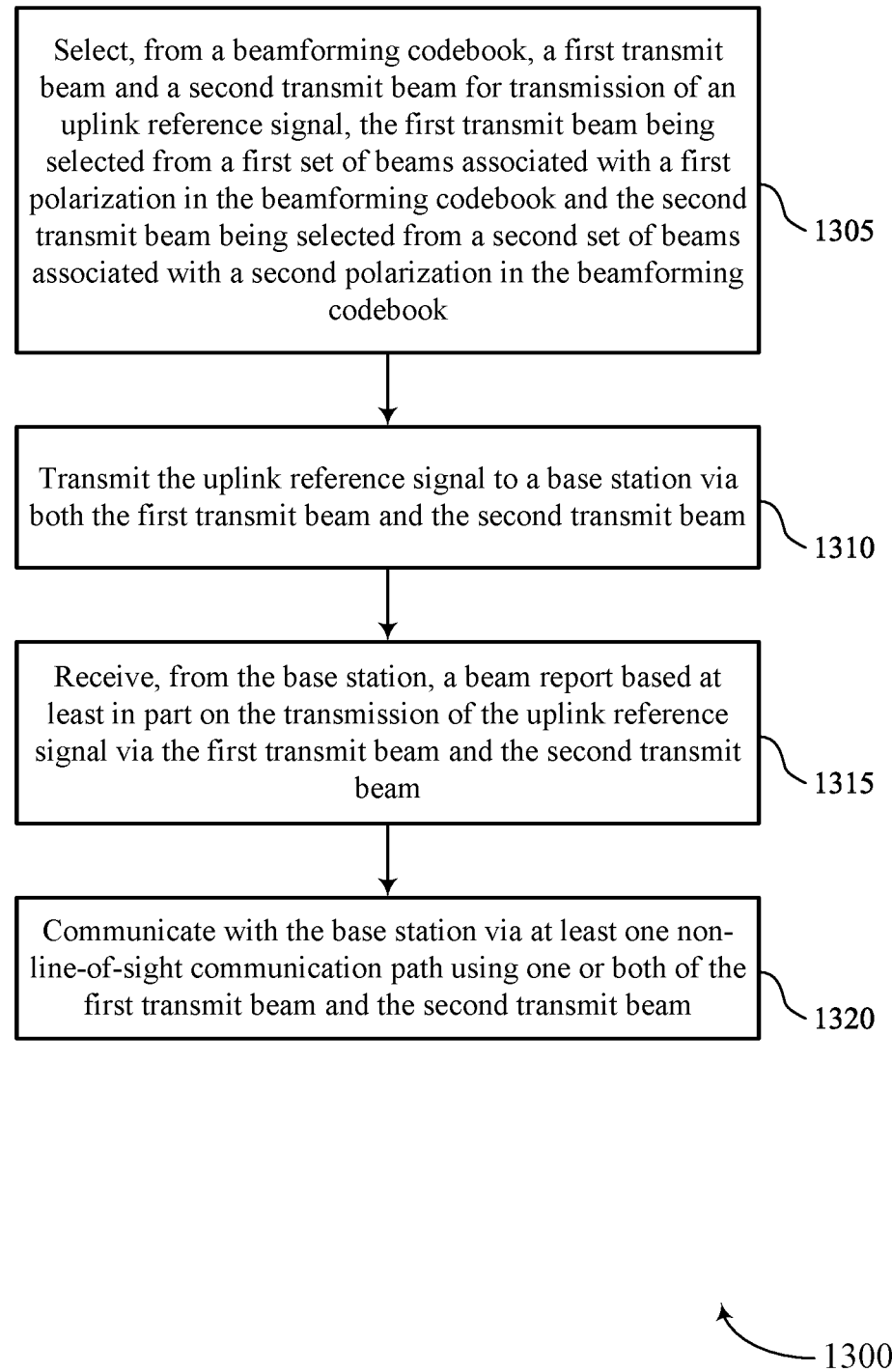

FIG. 13 shows a flowchart illustrating a method 1300 that supports techniques for per-polarization beam scheduling for MIMO communication in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook. The operations of 1305 may be performed in accordance with examples as disclosed herein. In some examples, aspects of the operations of 1305 may be performed by a beam selection component 830 as described with reference to FIG. 8.

At 1310, the method may include transmitting the uplink reference signal to a base station via both the first transmit beam and the second transmit beam. The operations of 1310 may be performed in accordance with examples as disclosed herein. In some examples, aspects of the operations of 1310 may be performed by an uplink reference signal component 845 as described with reference to FIG. 8.

At 1315, the method may include receiving, from the base station, a beam report based on the transmission of the uplink reference signal via the first transmit beam and the second transmit beam. The operations of 1315 may be performed in accordance with examples as disclosed herein. In some examples, aspects of the operations of 1315 may be performed by a beam report component 840 as described with reference to FIG. 8.

At 1320, the method may include communicating with the base station via at least one non-line-of-sight communication path using one or both of the first transmit beam and the second transmit beam. The operations of 1320 may be performed in accordance with examples as disclosed herein.

In some examples, aspects of the operations of 1320 may be performed by a communication component 850 as described with reference to FIG. 8.

The following provides an overview of aspects of the present disclosure:

Aspect 1: A method for wireless communication at a UE, comprising: receiving a downlink reference signal from a base station; selecting, from a beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook; measuring a receive strength of the downlink reference signal on both the first receive beam and the second receive beam; and transmitting, to the base station, a beam report that identifies the first receive beam and the second receive beam.

Aspect 2: The method of aspect 1, wherein selecting the first receive beam and the second receive beam comprises: selecting the first receive beam independent of the second receive beam.

Aspect 3: The method of any of aspects 1 through 2, wherein selecting the first receive beam and the second receive beam comprises: selecting at least one of the first receive beam and the second receive beam based at least in part on historical information stored at the UE.

Aspect 4: The method of any of aspects 1 through 3, wherein selecting the first receive beam and the second receive beam comprises: selecting the first receive beam from the first set of beams and the second receive beam from the second set of beams based at least in part on the first receive beam and the second receive beam each having a greatest receive beam strength with respect to the downlink reference signal relative to a remainder of the first set of beams and the second set of beams, respectively.

Aspect 5: The method of aspect 4, wherein historical information stored at the UE indicates that the first receive beam and the second receive beam each have had the greatest receive beam strength with respect to the downlink reference signal relative to the remainder of the first set of beams and the second set of beams, respectively.

Aspect 6: The method of any of aspects 1 through 5, further comprising: communicating with the base station via at least one NLoS communication path using at least one of the first receive beam and the second receive beam.

Aspect 7: The method of any of aspects 1 through 6, wherein transmitting the beam report comprises: including in the beam report an indication of a first RSRP value associated with use of the first receive beam and the second receive beam, wherein the first RSRP value is greater than a second RSRP value associated with use of a pre-configured receive beam pair.

Aspect 8: The method of any of aspects 1 through 7, wherein the first polarization comprises a horizontal polarization and the second polarization comprises a vertical polarization.

Aspect 9: The method of any of aspects 1 through 8, wherein the downlink reference signal comprises an SSB having a beam index which corresponds to a TTI.

Aspect 10: The method of any of aspects 1 through 9, wherein the beamforming codebook is for MIMO communication.

Aspect 11: The method of any of aspects 1 through 10, wherein the UE and the base station communicate over an mmW radio frequency spectrum band.

Aspect 12: A method for wireless communication at a UE, comprising: selecting, from a beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook; transmitting the uplink reference signal to a base station via both the first transmit beam and the second transmit beam; and receiving, from the base station, a beam report based at least in part on the transmission of the uplink reference signal via the first transmit beam and the second transmit beam.

Aspect 13: The method of aspect 12, wherein selecting the first transmit beam and the second transmit beam comprises: selecting the first transmit beam independent of the second transmit beam.

Aspect 14: The method of any of aspects 12 through 13, wherein selecting the first transmit beam and the second transmit beam comprises: selecting at least one of the first transmit beam and the second transmit beam based at least in part on historical information stored at the UE.

Aspect 15: The method of any of aspects 12 through 14, wherein selecting the first transmit beam and the second transmit beam comprises: selecting the first transmit beam from the first set of beams and the second transmit beam from the second set of beams based at least in part on the first transmit beam and the second transmit beam each having a greatest received beam strength at the base station relative to a remainder of the first set of beams and the second set of beams, respectively.

Aspect 16: The method of aspect 15, wherein historical information stored at the UE indicates that the first transmit beam and the second transmit beam each have the greatest received strength at the base station relative to the remainder of the first set of beams and the second set of beams, respectively.

Aspect 17: The method of any of aspects 12 through 16, further comprising: communicating with the base station via at least one NLoS communication path using at least one of the first transmit beam and the second transmit beam.

Aspect 18: The method of any of aspects 12 through 17, wherein receiving the beam report comprises: identifying in the beam report an indication of a first RSRP value associated with use of the first transmit beam and the second transmit beam, wherein the first RSRP value is greater than a second RSRP value associated with use of a pre-configured transmit beam pair.

Aspect 19: The method of any of aspects 12 through 18, wherein the first polarization comprises a horizontal polarization and the second polarization comprises a vertical polarization.

Aspect 20: The method of any of aspects 12 through 19, wherein the uplink reference signal comprises an SRS.

Aspect 21: The method of any of aspects 12 through 20, wherein the beamforming codebook is for MIMO communication.

Aspect 22: The method of any of aspects 12 through 21, wherein the UE and the base station communicate over an mmW radio frequency spectrum band.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a UE, comprising a processor; memory coupled with the processor; and instructions stored in the memory and executable by the processor to cause the apparatus to perform a method of any of aspects 12 through 22.

Aspect 27: An apparatus for wireless communication at a UE, comprising at least one means for performing a method of any of aspects 12 through 22.

Aspect 28: A non-transitory computer-readable medium storing code for wireless communication at a UE, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories that store instructions; and
   one or more processors coupled with the one or more memories and configured to execute the instructions to cause the UE to:
   receive a downlink reference signal from a network device;
   select, from a beamforming codebook and based at least in part on historical information stored at the UE that indicates one or more performance statistics associated with beams in the beamforming codebook, a first receive beam and a second receive beam to be measured for receive beam strength with respect to the downlink reference signal, the first receive beam selected from a first set of beams associated with a first polarization in the beamforming codebook and the second receive beam selected from a second set of beams associated with a second polarization in the beamforming codebook in accordance with the one or more performance statistics associated with the beams in the beamforming codebook;
   measure, based at least in part on selection of the first receive beam and the second receive beam, a receive strength of the downlink reference signal on both the first receive beam and the second receive beam; and
   transmit, to the network device, a beam report that identifies the first receive beam and the second receive beam.

2. The apparatus of claim 1, wherein, to select the first receive beam and the second receive beam, the one or more processors are configured to execute the instructions to cause the UE to:
   select the first receive beam independent of the second receive beam.

3. The apparatus of claim 1, wherein, to select the first receive beam and the second receive beam, the one or more processors are configured to execute the instructions to cause the UE to:
   select the first receive beam from the first set of beams and the second receive beam from the second set of beams based at least in part on the first receive beam and the second receive beam each having a greatest receive beam strength with respect to the downlink reference signal relative to a remainder of the first set of beams and the second set of beams, respectively, in accordance with the one or more performance statistics associated with the beams in the beamforming codebook.

4. The apparatus of claim 3, wherein the historical information stored at the UE indicates, via the one or more performance statistics associated with the beams in the beamforming codebook, that the first receive beam and the second receive beam each have had the greatest receive beam strength with respect to the downlink reference signal relative to the remainder of the first set of beams and the second set of beams, respectively.

5. The apparatus of claim 3, wherein the one or more performance statistics include a first receive beam strength associated with the first receive beam with respect to the downlink reference signal, a second receive beam strength associated with the second receive beam with respect to the downlink reference signal, one or more first receive beam strengths associated with the remainder of the first set of beams with respect to the downlink reference signal, and one or more second receive beam strengths associated with the remainder of the second set of beams with respect to the downlink reference signal, wherein the first receive beam strength is the greatest receive beam strength relative to the one or more first receive beam strengths, and wherein the second receive beam strength is the greatest receive beam strength relative to the one or more second receive beam strengths.

6. The apparatus of claim 1, wherein the one or more processors are configured to execute the instructions to cause the UE to:
communicate with the network device via at least one non-line-of-sight communication path via one or both of the first receive beam and the second receive beam.

7. The apparatus of claim 1, wherein to transmit the beam report, the one or more processors are configured to execute the instructions to cause the UE to:
include, in the beam report, an indication of a first reference signal receive power value associated with use of the first receive beam and the second receive beam, wherein the first reference signal receive power value is greater than a second reference signal receive power value associated with use of a pre-configured receive beam pair.

8. The apparatus of claim 1, wherein the first polarization comprises a horizontal polarization and the second polarization comprises a vertical polarization.

9. The apparatus of claim 1, wherein the downlink reference signal comprises a synchronization signal block that has a beam index which corresponds to a transmission time interval.

10. The apparatus of claim 1, wherein:
the beamforming codebook is for multiple-input multiple-output communication; and
the UE and the network device communicate over a millimeter wave radio frequency spectrum band.

11. An apparatus for wireless communication at a user equipment (UE), comprising:
one or more memories that store instructions; and
one or more processors coupled with the one or more memories and configured to execute the instructions to cause the UE to:
select, from a beamforming codebook and based at least in part on historical information stored at the UE that indicates one or more performance statistics associated with beams in the beamforming codebook, a first transmit beam and a second transmit beam for transmission of an uplink reference signal, the first transmit beam selected from a first set of beams associated with a first polarization in the beamforming codebook and the second transmit beam selected from a second set of beams associated with a second polarization in the beamforming codebook in accordance with the one or more performance statistics associated with the beams in the beamforming codebook;
transmit, based at least in part on selection of the first transmit beam and the second transmit beam, the uplink reference signal to a network device via both the first transmit beam and the second transmit beam; and
receive, from the network device, a beam report based at least in part on the transmission of the uplink reference signal via the first transmit beam and the second transmit beam.

12. The apparatus of claim 11, wherein, to select the first transmit beam and the second transmit beam, the one or more processors are configured to execute the instructions to cause the UE to:
select the first transmit beam independent of the second transmit beam.

13. The apparatus of claim 11, wherein, to select the first transmit beam and the second transmit beam, the one or more processors are configured to execute the instructions to cause the UE to:
select the first transmit beam from the first set of beams and the second transmit beam from the second set of beams based at least in part on the first transmit beam and the second transmit beam each having a greatest receive beam strength at the network device with respect to the uplink reference signal relative to a remainder of the first set of beams and the second set of beams, respectively, in accordance with the one or more performance statistics associated with the beams in the beamforming codebook.

14. The apparatus of claim 13, wherein the historical information stored at the UE indicates, via the one or more performance statistics associated with the beams in the beamforming codebook, that the first transmit beam and the second transmit beam each have the greatest receive beam strength at the network device with respect to the uplink reference signal relative to the remainder of the first set of beams and the second set of beams, respectively.

15. The apparatus of claim 13, wherein the one or more performance statistics include a first receive beam strength at the network device associated with the first transmit beam with respect to the uplink reference signal, a second receive beam strength at the network device associated with the second transmit beam with respect to the uplink reference signal, one or more first receive beam strengths at the network device associated with the remainder of the first set of beams with respect to the uplink reference signal, and one or more second receive beam strengths at the network device associated with the remainder of the second set of beams with respect to the uplink reference signal, wherein the first receive beam strength is the greatest receive beam strength relative to the one or more first receive beam strengths, and wherein the second receive beam strength is the greatest receive beam strength relative to the one or more second receive beam strengths.

16. The apparatus of claim 11, wherein the one or more processors are configured to execute the instructions to cause the UE to:
communicate with the network device via at least one non-line-of-sight communication path via one or both of the first transmit beam and the second transmit beam.

17. The apparatus of claim 11, wherein, to receive the beam report, the one or more processors are configured to execute the instructions to cause the UE to:

identify, in the beam report, an indication of a first reference signal receive power value associated with use of the first transmit beam and the second transmit beam, wherein the first reference signal receive power value is greater than a second reference signal receive power value associated with use of a pre-configured transmit beam pair.

18. The apparatus of claim 11, wherein the first polarization comprises a horizontal polarization and the second polarization comprises a vertical polarization.

19. The apparatus of claim 11, wherein the uplink reference signal comprises a sounding reference signal.

20. The apparatus of claim 11, wherein:
the beamforming codebook is for multiple-input multiple-output communication; and
the UE and the network device communicate over a millimeter wave radio frequency spectrum band.

21. A method for wireless communication at a user equipment (UE), comprising:
receiving a downlink reference signal from a network device;
selecting, from a beamforming codebook and based at least in part on historical information stored at the UE that indicates one or more performance statistics associated with beams in the beamforming codebook, a first receive beam and a second receive beam to be measured for receive beam strength with respect to the downlink reference signal, the first receive beam being selected from a first set of beams associated with a first polarization in the beamforming codebook and the second receive beam being selected from a second set of beams associated with a second polarization in the beamforming codebook in accordance with the one or more performance statistics associated with the beams in the beamforming codebook;
measuring, based at least in part on selecting the first receive beam and the second receive beam, a receive strength of the downlink reference signal on both the first receive beam and the second receive beam; and
transmitting, to the network device, a beam report that identifies the first receive beam and the second receive beam.

22. The method of claim 21, wherein selecting the first receive beam and the second receive beam comprises:
selecting the first receive beam independent of the second receive beam.

23. The method of claim 21, wherein selecting the first receive beam and the second receive beam comprises:
selecting the first receive beam from the first set of beams and the second receive beam from the second set of beams based at least in part on the first receive beam and the second receive beam each having a greatest receive beam strength with respect to the downlink reference signal relative to a remainder of the first set of beams and the second set of beams, respectively, in accordance with the one or more performance statistics associated with the beams in the beamforming codebook.

24. The method of claim 23, wherein the historical information stored at the UE indicates, via the one or more performance statistics associated with the beams in the beamforming codebook, that the first receive beam and the second receive beam each have had the greatest receive beam strength with respect to the downlink reference signal relative to the remainder of the first set of beams and the second set of beams, respectively.

25. The method of claim 23, wherein the one or more performance statistics include a first receive beam strength associated with the first receive beam with respect to the downlink reference signal, a second receive beam strength associated with the second receive beam with respect to the downlink reference signal, one or more first receive beam strengths associated with the remainder of the first set of beams with respect to the downlink reference signal, and one or more second receive beam strengths associated with the remainder of the second set of beams with respect to the downlink reference signal, wherein the first receive beam strength is the greatest receive beam strength relative to the one or more first receive beam strengths, and wherein the second receive beam strength is the greatest receive beam strength relative to the one or more second receive beam strengths.

26. A method for wireless communication at a user equipment (UE), comprising:
selecting, from a beamforming codebook and based at least in part on historical information stored at the UE that indicates one or more performance statistics associated with beams in the beamforming codebook, a first transmit beam and a second transmit beam for transmission of an uplink reference signal, the first transmit beam being selected from a first set of beams associated with a first polarization in the beamforming codebook and the second transmit beam being selected from a second set of beams associated with a second polarization in the beamforming codebook in accordance with the one or more performance statistics associated with the beams in the beamforming codebook;
transmitting, based at least in part on selecting the first transmit beam and the second transmit beam, the uplink reference signal to a network device via both the first transmit beam and the second transmit beam; and
receiving, from the network device, a beam report based at least in part on the transmission of the uplink reference signal via the first transmit beam and the second transmit beam.

27. The method of claim 26, wherein selecting the first transmit beam and the second transmit beam comprises:
selecting the first transmit beam independent of the second transmit beam.

28. The method of claim 26, wherein selecting the first transmit beam and the second transmit beam comprises:
selecting the first transmit beam from the first set of beams and the second transmit beam from the second set of beams based at least in part on the first transmit beam and the second transmit beam each having a greatest receive beam strength at the network device with respect to the uplink reference signal relative to a remainder of the first set of beams and the second set of beams, respectively, in accordance with the one or more performance statistics associated with the beams in the beamforming codebook.

29. The method of claim 28, wherein the historical information stored at the UE indicates, via the one or more performance statistics associated with the beams in the beamforming codebook, that the first transmit beam and the second transmit beam each have the greatest receive beam strength at the network device with respect to the uplink reference signal relative to the remainder of the first set of beams and the second set of beams, respectively.

30. The method of claim 28, wherein the one or more performance statistics include a first receive beam strength at the network device associated with the first transmit beam with respect to the uplink reference signal, a second receive beam strength at the network device associated with the second transmit beam with respect to the uplink reference signal, one or more first receive beam strengths at the network device associated with the remainder of the first set of beams with respect to the uplink reference signal, and one or more second receive beam strengths at the network device associated with the remainder of the second set of beams with respect to the uplink reference signal, wherein the first receive beam strength is the greatest receive beam strength relative to the one or more first receive beam strengths, and wherein the second receive beam strength is the greatest receive beam strength relative to the one or more second receive beam strengths.

* * * * *